(12) United States Patent
Shimoyama et al.

(10) Patent No.: US 7,171,948 B2
(45) Date of Patent: Feb. 6, 2007

(54) IGNITION DEVICE FOR INTERNAL COMBUSTION ENGINE

(75) Inventors: Akira Shimoyama, Numazu (JP);
Kiyotada Nakauchi, Numazu (JP);
Yasukazu Hatano, Numazu (JP);
Masayuki Sugiyama, Numazu (JP)

(73) Assignee: Kokusan Denki Co., Ltd., Shizuoka-ken (JP)

( * ) Notice: Subject to any disclaimer, the term of this patent is extended or adjusted under 35 U.S.C. 154(b) by 0 days.

(21) Appl. No.: 11/342,405

(22) Filed: Jan. 30, 2006

(65) Prior Publication Data
US 2006/0169249 A1 Aug. 3, 2006

(30) Foreign Application Priority Data
Feb. 3, 2005 (JP) .............................. 2005-027649

(51) Int. Cl.
*F02P 5/145* (2006.01)
*F02P 1/00* (2006.01)
(52) U.S. Cl. ........................... 123/406.57; 123/406.53; 123/600
(58) Field of Classification Search ........... 123/406.53, 123/406.56, 406.57, 599, 600
See application file for complete search history.

(56) References Cited

U.S. PATENT DOCUMENTS 4,633,834 A * 1/1987 Takeuchi et al. ....... 123/406.57
5,875,763 A * 3/1999 Mottier et al. ......... 123/406.53

FOREIGN PATENT DOCUMENTS

| JP | 2003-013829 | 1/2003 |
|----|-------------|--------|
| JP | 2003-307171 | 10/2003 |

* cited by examiner

*Primary Examiner*—Erick Solis
(74) *Attorney, Agent, or Firm*—Pearne & Gordon LLP

(57) ABSTRACT

A capacitor-discharge-type ignition device for an internal combustion engine, comprising: an exciter coil that generates an AC voltage having a positive half-wave voltage and first and second negative half-wave voltages present before and after the positive half-wave voltage synchronously with rotation of the engine; ignition-position detection time data calculating means that arithmetically operates as ignition position detection time data, the time period that is required for the engine to rotate from the generating position of the second negative half-wave voltage to an ignition position suitable in starting period, at the rotational speed of the engine that is obtained from time period from generation of the first negative half-wave voltage to the generation of the second negative half-wave voltage, and from an angle between the generating position of the first negative half-wave voltage and that of the second negative half-wave voltage, wherein a crank angle position when the measurement of the arithmetically operated ignition position detection time data is completed is determined as an ignition position at a low speed operation of the engine.

20 Claims, 10 Drawing Sheets

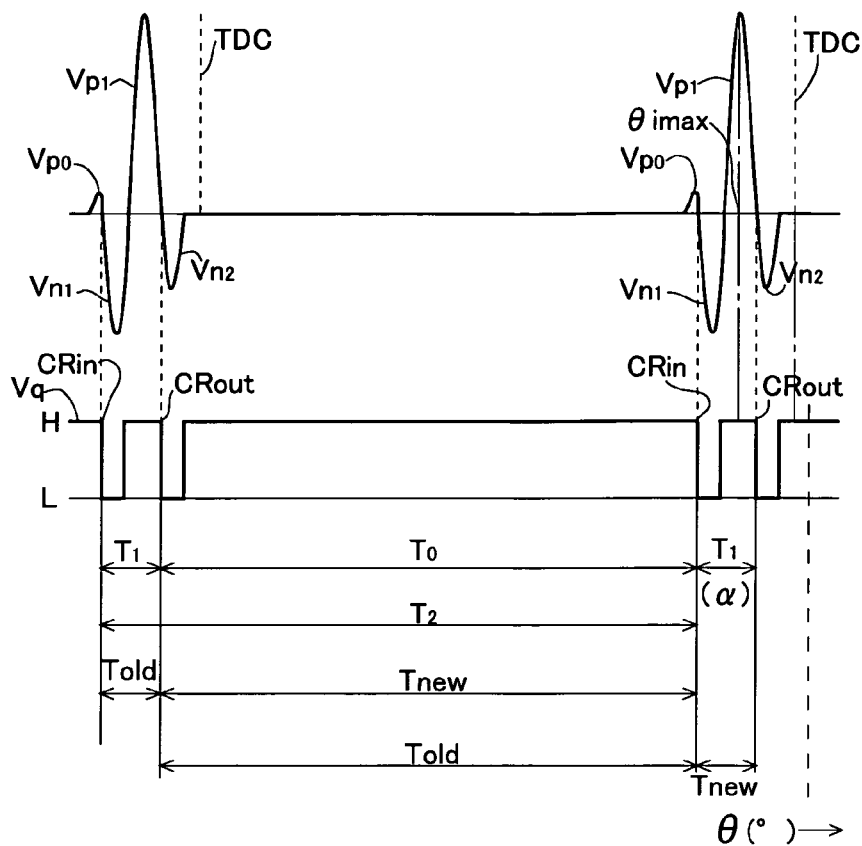
Fig. 4A
Fig. 4B
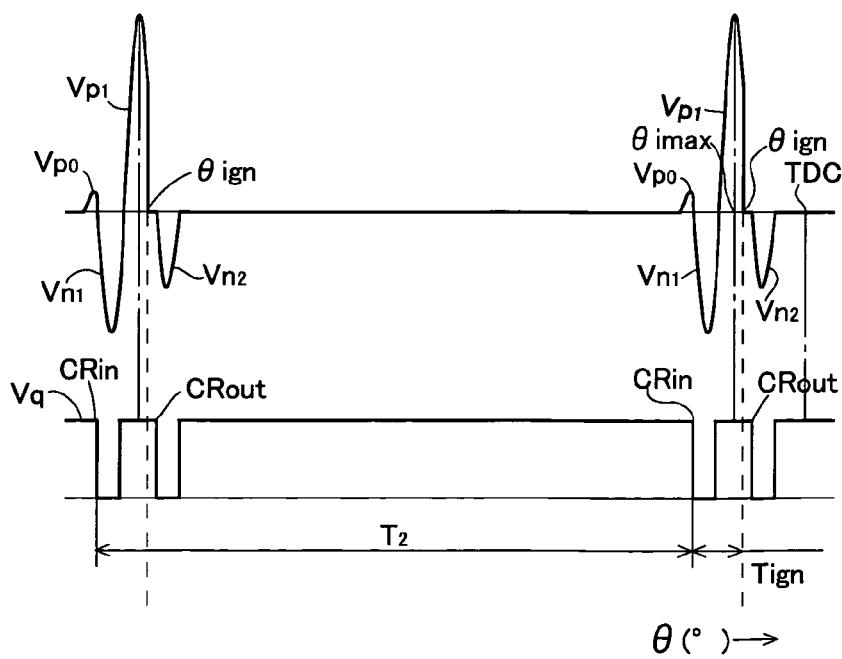
Fig. 5A
Fig. 5B

Fig. 6A
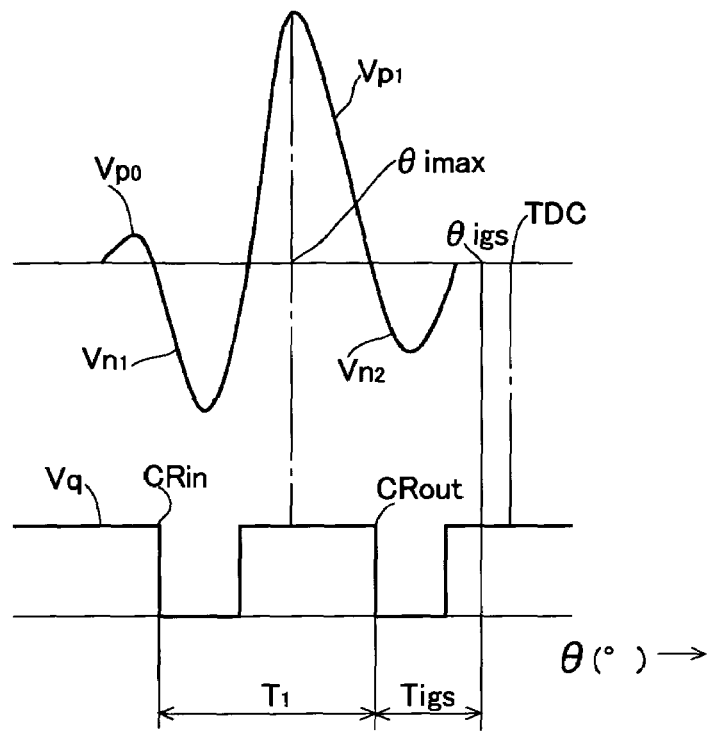
Fig. 6B
Fig. 7
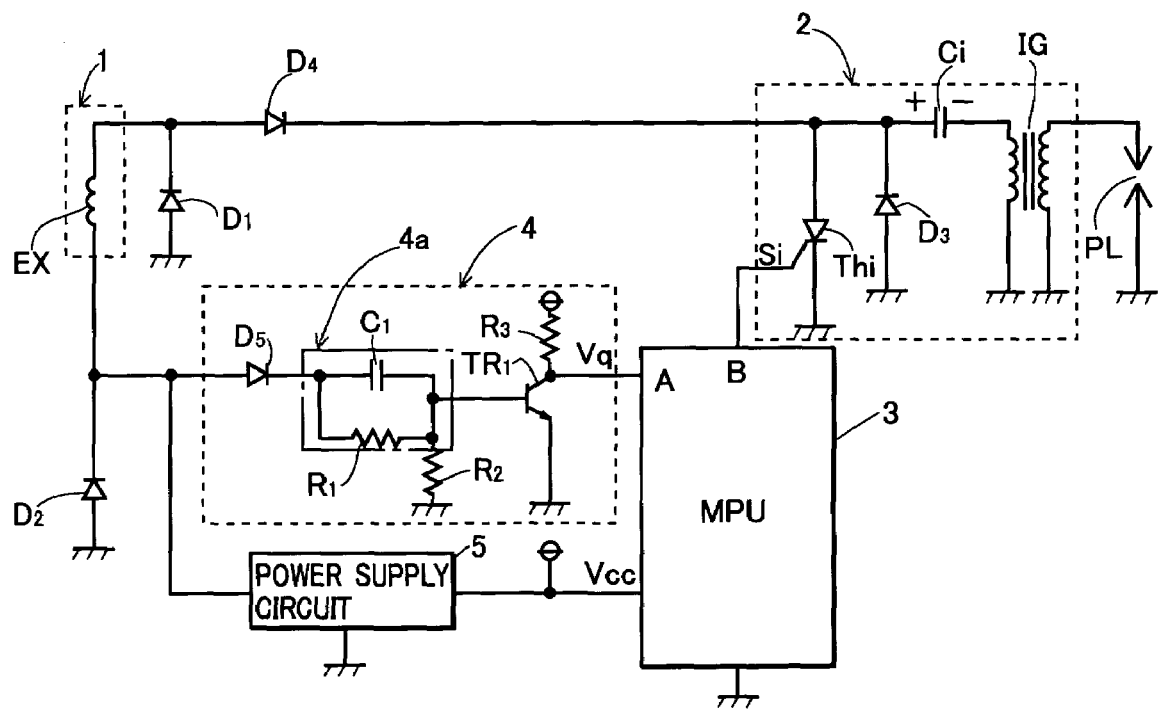

IGNITION DEVICE FOR INTERNAL COMBUSTION ENGINE

TECHNICAL FIELD OF THE INVENTION

The present invention relates to a capacitor-discharge-type ignition device for an internal combustion engine.

BACKGROUND OF THE INVENTION

A capacitor-discharge-type ignition device for an internal combustion engine comprises an ignition coil, an ignition capacitor provided in a primary side of the ignition coil and charged in one polarity by an output of an ignition power supply, a discharge switch which becomes a conducting state when receiving an ignition signal and causes electrical charges stored in the ignition capacitor to be discharged through the primary coil of the ignition coil, and an ignition control unit for supplying the ignition signal to the discharge switch at an ignition timing of the internal combustion engine. As the ignition power supply, exciter coils provided in magneto AC generators mounted to engines are often used.

For current vehicles driven by internal combustion engines and apparatuses driven by internal combustion engines, it is required to control an ignition position of an engine (a crank angle position at which ignition is performed) in a complicated manner depending on various control conditions including a rotational speed of the engine in order to reduce noise caused by the engine, purify exhaust gas, or provide efficient operation. Because of this, ignition devices having an ignition control unit with a microprocessor are used, even in internal combustion engines that require cost reduction.

When controlling an ignition timing using a microprocessor, information on a particular crank angle position of the engine is obtained in any manner; a rotational speed of the engine is arithmetically operated based on the crank angle position information; and an ignition position of the engine is arithmetically operated with respect to various control conditions including the arithmetically operated rotational speed.

The crank angle position information mentioned above is information that, for example, indicates that the crank angle position of the engine is at a reference crank angle position having a certain relation with respect to a top dead center position (a crank angle position when the piston reaches the top dead center). In this case, the ignition position of the engine is arithmetically operated as an angle from the reference crank angle position to the ignition position or an angle from the top dead center to the ignition position. The angle indicating the ignition position arithmetically operated is converted to ignition timing detection time data by using the rotational speed of the engine at that time. The ignition timing detection time data represents a time period required for the engine to take from the reference crank angle position to the ignition position at the rotational speed at that time (time period to be measured by a timer in the microprocessor).

The ignition control unit recognizes that the crank angle position of the engine coincides with the reference crank angle position upon occurrence of a signal indicating the reference crank angle position, then sets ignition timing measurement data into a timer for measurement of ignition timing (or an "ignition timer"), and generates an ignition signal upon completion of the measurement of the time data that has been set by the ignition timer.

As a signal source for obtaining the crank angle information of the engine, a pulser (a pulse signal generator) is used that generates a pulse signal at the reference crank angle position of the engine, while it may be required to omit the pulser when cost reduction is important.

An ignition device having no pulser, or so-called pulserless-type ignition device is disclosed, for example, in Japanese Patent Laid-Open Publication No. 2003-307171. In this pulserless-type ignition device, crank angle information is obtained from an output voltage of an exciter coil that is provided to charge an ignition capacitor. In the case of obtaining the crank angle information from the output voltage of the exciter coil, a magneto generator is comprised so that the exciter coil generates, only once for one cylinder during one rotation of a crankshaft in forward rotation of the engine, an AC voltage of a waveform, as shown in FIG. 15, that has a positive half-wave voltage Vp1 having a peak value that is adequate to charge the ignition capacitor and first and second negative half-wave voltages Vn1 and Vn2 occurring before and after the positive half-wave voltage Vp1, respectively.

In the ignition device disclosed in Japanese Patent Laid-Open Publication No. 2003-307171, the magneto generator is comprised so that the second negative half-wave voltage Vn2 is generated just before the top dead center position of the engine (a crank angle position when the piston reaches the top dead center) TDC. In this ignition device, there are employed as the ignition position in starting period, a crank angle position $\theta i0$ at the time when the magnitude of the second negative half-wave voltage Vn2 after passing the peak point is decreased to a set level Vs1, and as the ignition position in idling operation, a crank angle position $\theta i1$ just after the peak position of the second negative half-wave voltage Vn2. Also, in this ignition device, the positive half-wave voltage Vp1 is compared with a set voltage Vs2, and a crank angle position at the time when the positive half-wave voltage Vp1 is equal to the set voltage Vs2 is detected as a reference crank angle position $\theta s$. The reference crank angle position $\theta s$ is a position where time data for obtaining the rotational speed of the engine is taken and the measurement of the arithmetically operated ignition position is started, and is set at more advanced position than the ignition position where the advance angle width is at maximum.

A microprocessor obtains a time measured by the timer for each detection of the reference crank angle position $\theta s$, then obtains as rotational speed detection time data, the time period from the previous detection of the reference crank angle position to the current detection of the reference crank angle position (i.e. time period required for one rotation of the crankshaft), and arithmetically operates the rotational speed of the engine from the time data. The microprocessor also arithmetically operates an ignition position of the engine with respect to the arithmetically operated rotational speed, and obtains as ignition position measurement time data, a time period that is required for the engine to rotate to the arithmetically operated ignition position at the current rotational speed, then sets the time data into the timer and causes the timer to start the measurement of the time data. The set voltage Vs2, which is compared with the positive half-wave voltage Vp1 to obtain the reference crank angle position, is set to be equal to a value near the minimum value of the charging voltage of the ignition capacitor required for desirable ignition operation.

In starting period of the engine, ignition operation is performed by generating an ignition signal when the crank angle position $\theta i0$ is detected, while in idling operation of the engine, ignition operation is performed by generating an ignition signal when the crank angle position θi1 is detected. In a steady-state operation period where the rotational speed of the engine is higher than the idling rotational speed, ignition operation is performed by arithmetically operating an ignition position of the engine with respect to the rotational speed detected at the reference crank angle position θs, converting the arithmetically operated ignition position to ignition position measurement time data, and causing the ignition timer to measure the time data and generate an ignition signal at the completion of the measurement.

An ignition device disclosed in Japanese Patent Laid-Open No. 2003-13829 is known as an ignition device in which an ignition capacitor is charged by using AC voltage of waveform as shown in FIG. 15, and rotation information is obtained including information on the reference crank angle position of an engine. In the ignition device disclosed in Japanese Patent Laid-Open Publication No. 2003-13829, the ignition position in starting period is set at a rising point or peak point of the second negative half-wave voltage Vn2 of AC voltage shown in FIG. 15, and the peak point of the first negative half-wave voltage Vn1 is detected as the reference crank angle position.

Note that the starting period of the internal combustion engine used herein means a transient period required from the initiation of starting operation, through completion of the starting operation of the engine, to reaching of a rotation-sustainable state of the engine.

When the ignition capacitor is charged with the positive half-wave voltage Vp1 in AC voltage of waveform as shown in FIG. 15, a delay of the positive half-wave voltage Vp1 occurs in high speed operation of the engine due to armature reaction. Accordingly, the angle between the reference crank angle position θs and the ignition position in starting period θi0 must be substantially large so that both the condition for obtaining a desired maximum advance angle width and the condition for setting the ignition position in starting period at a position close to the top dead center can be met. Therefore, the conventional ignition device has a problem that a large-size magneto generator is necessary, since it is required to provide large spacing between magnetic poles of a rotor and a stator in the magneto generator in order to increase the widths of the positive half-wave voltage and negative half-wave voltages generated by the exciter coil.

Moreover, in the case where, as described above, the positive half-wave voltage Vp1 of the exciter coil is compared with the set voltage Vs2 to obtain the reference crank angle position θs, it required to provide a hardware circuit having a comparator for comparing analog voltages to obtain the reference crank angle position and also required to provide a peak detection circuit for detecting a peak position of the negative half-wave voltage. It is supposed that the peak position of the negative half-wave voltage may be detected by digital process, but this requires an A/D converter, and therefore, there is a problem in either case that a complicated hardware circuit is needed leading to a higher cost.

It is also supposed that when measuring the ignition position after the engine has started, measurement of ignition position measurement time data is performed over a section corresponding to about one rotation of the crankshaft while regarding a zero-cross point or peak point of the second negative half-wave voltage Vn2 as the reference crank angle position, and after the detection of the reference crank angle position, an ignition signal is generated after about one more rotation of the crankshaft, in order to allow a large advance angle width. However, in a low speed operation of the engine, variation in rotational speed during one rotation of the crankshaft is large, and therefore, in the case where the measurement of ignition position is performed over the section corresponding to about one rotation of the crankshaft, measurement error of the ignition position in a low speed operation is large and the ignition position cannot be controlled with high accuracy. It is preferred that the angle from the reference crank angle position to the ignition position is as small as possible so that the ignition position can be controlled with high accuracy.

Moreover, in order to an ignition signal to be generated after about one rotation after the detection of the reference crank angle position, as described above, it is required to employ as the rotational speed used in arithmetic operation for obtaining the ignition position detection time data, a rotational speed of the engine detected in the section from the point of two rotation before to the point of one rotation before, so that there is large difference between the rotational speed used in the arithmetic operation for obtaining the ignition position detection time data and the actual rotational speed at the ignition timing, resulting in a poor responsibility of ignition position control against variation in rotational speed of the engine, which must make the rotation in starting period of the engine unstable.

SUMMARY OF THE INVENTION

An object of the present invention is to provide a pulser-less-type ignition device for an internal combustion engine which allows a large advance angle width while not requiring a large-size magneto AC generator.

Another object of the present invention is to provide an ignition device for an internal combustion engine which uses a zero-cross point of an output voltage of an exciter coil as a reference crank position so that the detection of the reference crank angle position is performed without a complicated hardware circuit, and allows the angle from the reference crank angle position to the ignition position to be decreased thereby providing accurate control of the ignition device in starting period of the engine.

The present invention is directed to an ignition device for an internal combustion engine, comprising: an exciter coil that is provided in a magneto AC generator rotating synchronously with an internal combustion engine and generates once for every one rotation of a crankshaft of the engine in forward rotation of the internal combustion engine, an AC voltage having a positive half-wave voltage and first and second negative half-wave voltages present before and after the positive half-wave voltage, respectively; an ignition capacitor that is provided in a primary side of an ignition coil and is charged in one polarity with the positive half-wave voltages; a discharge switch that is provided to turn on upon receiving an ignition signal and cause electric charges stored in the ignition capacitors to be discharged through a primary coil of the ignition coil; and a ignition control unit that supplies the ignition signal to the discharge switch at an ignition position of the internal combustion engine.

In the specification, the polarity of each half-wave voltage of AC voltage outputted from the exciter coil does not mean any polarity on waveform charts, but, among half-wave voltages of one polarity and half-wave voltages of the other polarity in AC voltage outputted from the exciter coil, a half-wave of a polarity to be used for charging an ignition capacitor of the ignition circuit is referred to as a positive half-wave voltage while a half-wave of a polarity that is opposite to the polarity to be used for charging the ignition capacitor is referred to as a negative half-wave voltage.

The ignition control unit comprises: ignition signal generating means that has an ignition timer for measuring ignition position detection time data and generates the ignition signal when the ignition timer completes the measurement of ignition position detection time data; negative voltage generating position detecting means for detecting a generating position of the first negative half-wave voltage and a generating position of the second negative half-wave voltage; operation state determining means for determining whether the internal combustion engine is in a state of starting period or in a state after completion of starting operation; starting-period ignition controlling means for controlling the generating position of the ignition signal when the operation state determining means determines that the internal combustion engine is in a state of starting period; and steady-state-operation-period ignition controlling means for controlling the generating position of the ignition signal when the operation state determining means determines that the internal combustion engine is in a state after completion of starting operation of the internal combustion engine.

The starting-period ignition controlling means is comprised so as to, upon detection of the generating position of the second negative half-wave voltage, execute a process to arithmetically operate as the ignition position detection time data, time period that is required for the engine to rotate from the generating position of the second negative half-wave voltage to an ignition position suitable in starting period, at the rotational speed of the internal combustion engine that is obtained from time period from detection of the generating position of the first negative half-wave voltage to detection of the generating position of the second negative half-wave voltage, and an angle from the generating position of the first negative half-wave voltage to the generating position of the second negative half-wave voltage.

As described above, in the present invention, when the internal combustion engine is in a state of starting period, measurement is made at a generating position of the second negative half-wave voltage for obtaining the time period T1 between detection of the generating position of the first negative half-wave voltage and detection of the generating position of the second negative half-wave voltage; time data for detecting an ignition position in starting period of the engine is obtained by using information on the rotational speed of the engine obtained from the time period T1; and measurement of the time data is then immediately started to detect the ignition position in starting period and cause an ignition signal to be generated.

With the starting-period ignition controlling means having the construction described above, it is possible to detect, in starting period where the rotational speed of the crankshaft of the engine rapidly changes, a ignition position in starting period based on rotational speed information of the engine that is obtained just before the ignition position in starting period, so that the ignition position in starting period can be accurately detected thereby improving starting operation capability of the engine.

Also, with the starting-period ignition controlling means having the construction described above, it is possible to set the ignition position in starting period of the engine at a position that is further delayed from the generating position of the second negative half-wave voltage (a position advanced away from the section where the exciter coil generates AC voltage), thereby allowing an increased advance angle width of the ignition position.

Calculation of ignition position detection time data in steady-state operation period may also be executed at the generating position of the second negative half-wave voltage, but it is preferable that the ignition position detection time data of the engine is arithmetically operated from the rotational speed obtained just before starting the measurement of ignition position so that the measurement of the arithmetically operated ignition position in steady-state operation is accurately performed. Accordingly, it is preferable that the timing with which the calculation of ignition position detection time data and the process for causing the ignition timer to start the measurement of the time data are executed in steady-state operation period is the timing with which the first negative half-wave voltage is generated.

Therefore, in a preferred aspect of the present invention, the steady-state-operation-period ignition controlling means is comprised so as to, upon detection of the generating position of the first negative half-wave voltage, execute: a process to arithmetically operate, as the ignition position detection time data, by using a rotational speed of the internal combustion engine obtained from detection period T2 which is a time interval of the detection of the generating position of the first negative half-wave voltage, and an ignition position $\theta$ign in steady-state operation period of the internal combustion engine arithmetically operated based on the rotational speed, time period Tign required for the engine to rotate from the generating position of the first negative half-wave voltage to the arithmetically operated ignition position $\theta$ign at the rotational speed of the internal combustion engine obtained from the detection period T2; and a process to cause the ignition timer to start measurement of the ignition position detection time data.

In the case where, as described above, the process for measuring the ignition position in steady-state period is executed at the generating position of the first negative half-wave voltage which is prior to the generating position of the second negative half-wave voltage at which the process for measuring the ignition position in starting period of the engine is executed (the generating position of the first negative half-wave voltage is used as a reference crank angle position for determining the ignition position in steady-state operation period), this allows a large advance angle of the ignition position, and further makes it possible to provide accurate detection of the arithmetically operated ignition position and provide accurate control of the ignition position.

The negative voltage generating position detecting means can be comprised so as to detect the generating position of the first negative half-wave voltage and the generating position of the second negative half-wave voltage, depending on which is longer or shorter, time period from detection of the generating position of the first negative half-wave voltage to detection of the generating position of the second negative half-wave voltage or time period from detection of the generating position of the second negative half-wave voltage to detection of the generating position of the next first negative half-wave voltage.

In a preferred aspect of the present invention, there are provided: a wave-shaping circuit that receives an output voltage of the exciter coil as an input thereof and converts it to a rectangular wave signal falling at the generating position of the negative half-wave voltage; and elapse time detecting means that recognizes the falling of the rectangular wave signal as a crank signal, and reads a measurement value of the timer upon every recognition of the crank signal to detect elapse time from generation of a previous crank signal to generation of a current crank signal. In this case, the negative voltage generating position detecting means can be comprised so as to compare elapse time Told previously detected by the elapse time measuring means with elapse time Tnew currently detected, then detect that the current generating position of the crank signal is at the generating position of the first negative half-wave voltage if the relation Tnew<Told/k (k is a constant equal to or more than 1) is not met, and detect that the current generating position of the crank signal is at the generating position of the second negative half-wave voltage if the relation Tnew<Told/k is met.

The constant k is set so that it is larger than 1 and smaller than the value that is obtained by dividing the angle from the generating position of the second negative half-wave voltage generated during forward rotation of the internal combustion engine to the generating position of the next first negative half-wave voltage by the angle from the generating position of the first negative half-wave voltage to the generating position of the second negative half-wave voltage. With the constant k being set at an appropriate value, it is possible to eliminate the possibility of erroneously detecting the generating position of the first negative half-wave voltage and the generating position of the second negative half-wave voltage in the time of rapid acceleration or deceleration of the engine.

In another preferred aspect of the present invention, there are provided: a wave-shaping circuit that receives an output voltage of the exciter coil as an input thereof and converts it to a rectangular wave signal rising at the generating position of the negative half-wave voltage; and elapse time detecting means that recognizes the rising of the rectangular wave signal as a crank signal, and reads a measurement value of the timer upon every recognition of the crank signal to detect elapse time from generation of a previous crank signal to generation of a current crank signal. Also in this case, the negative voltage generating position detecting means can be comprised so as to compare elapse time Told previously detected by the elapse time measuring means with elapse time Tnew currently detected, then detect that the current generating position of the crank signal is at the generating position of the first negative half-wave voltage if the relation Tnew<Told/k (k is a constant equal to or more than 1) is not met, and detect that the current generating position of the crank signal is at the generating position of the second negative half-wave voltage if the relation Tnew<Told/k is met.

The operation state determining means can be comprised so as to determine that the internal combustion engine is in a state of starting period if the rotational speed of the internal combustion engine is lower than a starting determination speed, and the internal combustion engine is in a state of steady-state operation period if the rotational speed of the internal combustion engine has continued to be equal to or higher than the starting determination speed for a certain period. The starting determination speed is set to be equal to a rotational speed after completion of starting operation of the internal combustion engine.

The operation state determining means can be comprised so as to determine that the internal combustion engine is in a state of starting period if a rotational speed of the internal combustion engine is lower than a starting determination speed and a rotation count of the crankshaft of the engine after beginning of starting operation of the internal combustion engine is equal to or less than a set count, and determine that the internal combustion engine is in a state of steady-state operation period either if the rotational speed of the internal combustion engine has continued to be equal to or higher than the starting determination speed for a certain period or if the rotational speed of the internal combustion engine is lower than the starting determination speed but the rotation count of the crankshaft of the engine after beginning of starting operation of the internal combustion engine exceeds the set count. In this case, the set count is set at a value corresponding to a maximum rotation count of the crankshaft in the time when cranking is performed by human power while the internal combustion engine cannot be started (for example, in a state where ignition operation of the ignition device is stopped).

With the operation state determining means having the construction described above, in the case where the engine is started by a starting device using human power such as a recoil starter, it is determined that engine is in a state of starting operation if the rotational speed of the engine is lower than the starting determination speed and it is determined that the internal combustion engine is in a state of steady-state operation period if the engine has rotated continually with the rotational speed equal to or higher than the starting determination speed for a certain period, since the rotation count of the crankshaft after beginning of starting operation of the internal combustion engine does not exceed the set count. Accordingly, in the case of starting the engine by human power, the ignition position in starting period can be set at a position suitable in starting period near the top dead center position, thereby improving the starting capability of the engine.

On the other hand, in the case of starting the engine by performing cranking by using a starter motor, the engine maintains the rotation by the starter motor without spontaneous rotation thereof. In this case, when only one position suitable in starting period (ignition position for starting period) is set at a position near the top dead center position and ignition is performed at the set ignition position for starting period if it is determined that the rotational speed is lower than the set rotational speed during starting period and then the ignition for steady-state period is performed instead if the rotational speed reaches the set rotational speed, the possibility increases in which pulsation of cranking causes a phenomenon where the piston cannot move over the top dead center and is pushed back.

In order to prevent the above described problem from arising, in a preferred aspect of the present invention a plurality of the ignition positions for starting period are set in advance, and an optimum ignition position is selected from ignition positions that are set as the ignition positions for starting period depending on the rotational speed arithmetically operated from a cycle at which the generating position of the first negative half-wave voltage is detected. For example, it is preferable that two ignition positions for starting period is provided as suitable ignition positions in starting period: a first ignition position for starting period that is near the top dead center position, and a second ignition position for starting period that is advanced in angle from the first ignition position for starting period (a ignition position suitable as an ignition position in idling rotation), and the ignition-position switching rotational speed IGCHNE at which the ignition positions for starting period are switched and the starting determination speed SNCHNE with which it is determined whether the engine is in a state of starting period operation or not are set so that ignition operation is performed at the first ignition position for starting period near the top dead center position when IGCHNE<rotational speed is met and ignition operation is performed at the second ignition position for starting period when IGCHNE≦rotational speed<SNCHNE is met.

With the construction described above, it is possible to set the ignition position in the beginning of starting operation and the ignition position after the initial explosion at their respective optimum positions by, for example, providing a difference between the ignition position in the beginning of starting operation and the ignition position after the initial explosion, so that the starting operation capability of the engine can be improved and stable rotation of engine can be provided in transition period from the starting of the engine to idle operation.

In another preferred aspect of the present invention, the starting-period ignition controlling means further comprises ignition enabling/disabling means that enables generation of ignition signal in the starting period if a ratio T0/T1, which is ratio of time period T0 between detection of the generating position of the second negative half-wave voltage and detection of the generating position of the next first negative half-wave voltage to the time period T1 between detection of the generating position of the first negative half-wave voltage and detection of the generating position of the second negative half-wave voltage, is equal to or more than a set value, and disables generation of ignition signal in the starting period if the ratio T0/T1 is less than the set value.

With the starting-period ignition controlling means having the ignition enabling/disabling means described above, it is possible to prohibit ignition operation in the case of lack of cranking speed due to inadequate operation power, and therefore it is possible to prevent the occurrence of phenomenon where the piston cannot move over the top dead center and is pushed back in starting of the engine by human power by using a recoil starter or kick starter.

The ignition enabling/disabling means may also be comprised so as to enable generation of ignition signal in the starting period if the time period T1 between detection of the generating position of the first negative half-wave voltage and detection of the generating position of the second negative half-wave voltage is equal to or less than a set value, and disable generation of ignition signal in the starting period if the time period T1 is more than the set value.

The magneto AC generator having a certain pole construction of rotor thereof may generate another positive half-wave voltage having a peak value lower than the positive half-wave voltage just before the exciter coil generates the first negative half-wave voltage during forward rotation of the internal combustion engine. In the case where the exciter coil generates AC voltage having such waveform, two negative half-wave voltages also occurs during reverse rotation of the engine, so that possibility arises in which ignition also is performed in case of reverse rotation of the engine causing the engine to reversely rotate.

With the magneto AC generator having the construction described above, in order to prevent the reverse rotation of the engine, it is possible that the wave-shaping circuit comprises a filter comprised of a parallel circuit of a capacitor for filter and a resistor, and switch means which is in an on-state when the inputted negative half-wave voltage exceeds a voltage across the capacitor for filter, and across which a rectangular wave signal is generated; and a discharge time constant of the capacitor for filter is set so that the switch means changes from an off-state to the on-state upon every generation of each of the two negative half-wave voltage from the exciter coil during forward rotation of the internal combustion engine, while, during reverse rotation of the engine, the switch means changes from the off-state to the on-state upon generation of initial negative half-wave voltage but maintains the off-state upon generation of secondary negative half-wave voltage.

With the wave-shaping circuit having the above described construction, no crank signal is generated at the generating position of the second negative half-wave voltage during reverse rotation of the engine and thus the generating position of the second negative half-wave voltage cannot be detected, so that no ignition operation is performed in case of reverse rotation of the engine. Accordingly, the engine can be prohibited from ignition in case of the engine being caused to reversely rotate, thereby preventing the reverse rotation of the engine.

Note that in the case where the exciter coil generates no positive half-wave voltage prior to the first negative half-wave voltage because of a certain construction of the magneto AC generator, it is possible to prevent the reverse rotation of engine without use of the wave-shaping circuit as describe above since two negative half-wave voltages are not generated during reverse rotation of the engine.

In the case where the magneto AC generator generates another positive half-wave voltage having a peak value lower than the positive half-wave voltage generated between the first and second negative half-wave voltages just before the exciter coil generates the first negative half-wave voltage during forward rotation of the internal combustion engine, it is also possible to prevent the reverse rotation of the engine when the wave-shaping circuit comprises a filter comprised of a parallel circuit of a capacitor for filter and a resistor, and switch means which maintains an on-state when the inputted negative half-wave voltage is equal to or lower than a voltage across the capacitor for filter and is in the off-state while the inputted negative half-wave voltage exceeds the voltage across the capacitor for filter, and across which a rectangular wave signal is generated; and a discharge time constant of the capacitor for filter is set so that the switch means changes from the on-state to the off-state upon every generation of each of the two negative half-wave voltage from the exciter coil during forward rotation of the internal combustion engine, while, during reverse rotation of the internal combustion engine, the switch means changes from the on-state to the off-state upon generation of initial negative half-wave voltage but maintains the on-state upon generation of secondary negative half-wave voltage.

As described above, according to the present invention, when the internal combustion engine is in a state of starting period, measurement is made at a generating position of the second negative half-wave voltage for obtaining the time period from detection of the generating position of the first negative half-wave voltage to detection of the generating position of the second negative half-wave voltage; time data for detecting an ignition position in starting period of the engine is obtained by using information on the rotational speed of the engine obtained from the measured time period; and measurement of the time data is then immediately started to detect the ignition position in starting period and cause an ignition signal to be generated, so that, in starting period where the rotational speed of the crankshaft of the engine rapidly varies, the ignition position in starting period can be detected based on rotational speed information of the engine obtained just before the ignition position in starting period, and thus the ignition position in starting period can be accurately determined to provide stable rotation of the engine, thereby improving the starting capability of the engine.

Moreover, in the present invention, in the case where the process for measuring the ignition position in steady-state period is executed at the generating position of the first negative half-wave voltage which is prior to the generating position of the second negative half-wave voltage at which the process for measuring the ignition position in starting period of the engine is executed, this allows a large advance angle of the ignition position without requirement of a large-size magneto AC generator, and further makes it possible to provide accurate calculation of the ignition position and accurate detection of the arithmetically operated ignition position, thereby providing accurate control of the ignition position.

Further, in the present invention, in the case where there is provided ignition enabling/disabling means that enables generation of ignition signal in the starting period if a ratio T0/T1, which is ratio of time period T0 between detection of the generating position of the second negative half-wave voltage and detection of the generating position of the next first negative half-wave voltage to the time period T1 between detection of the generating position of the first negative half-wave voltage and detection of the generating position of the second negative half-wave voltage, is equal to or more than a set value, and disables generation of ignition signal in the starting period if the ratio T0/T1 is less than the set value, it is possible to prohibit ignition operation in the case of lack of cranking speed due to inadequate operation power in starting of the engine by human power, and therefore it is possible to prevent the occurrence of phenomenon (kettin) where the piston cannot move over the top dead center and is pushed back in starting of the engine by human power.

Furthermore, in the present invention, a similar effect can be provided in the case where the ignition enabling/disabling means is comprised so as to enable generation of ignition signal in the starting period if the time period T1 between detection of the generating position of the first negative half-wave voltage and detection of the generating position of the second negative half-wave voltage is equal to or less than a set value, and disable generation of ignition signal in the starting period if the time period T1 is more than the set value.

BRIEF DESCRIPTION OF THE DRAWINGS

The above and other objects and features of the invention will be apparent from the detailed description of the preferred embodiments of the invention, which are described and illustrated with reference to the accompanying drawings, in which;

FIGS. 4A and 4B are waveform charts which show a waveform of output voltage of an exciter coil and a waveform of rectangular wave signal obtained from a wave-shaping circuit, for illustrating a method for identifying positions of generation of negative half-wave voltages outputted from the exciter coil in an embodiment of the present invention;

FIGS. 5A and 5B are waveform charts which show a waveform of output voltage from an exciter coil and a waveform of rectangular wave signal, used for illustrating operation of an engine in steady-state operation period in an embodiment of the present invention;

FIGS. 6A and 6B are waveform charts which show a waveform of output voltage from an exciter coil and a waveform of rectangular wave signal, used for illustrating operation of an engine in starting operation in an embodiment of the present invention;

FIG. 7 is a circuit diagram showing a hardware construction of an ignition device according to another embodiment of the present invention;

DETAILED DESCRIPTION OF THE PREFERRED EMBODIMENTS

Preferred embodiments of the present invention will be described with reference to drawings.

Figure 1:
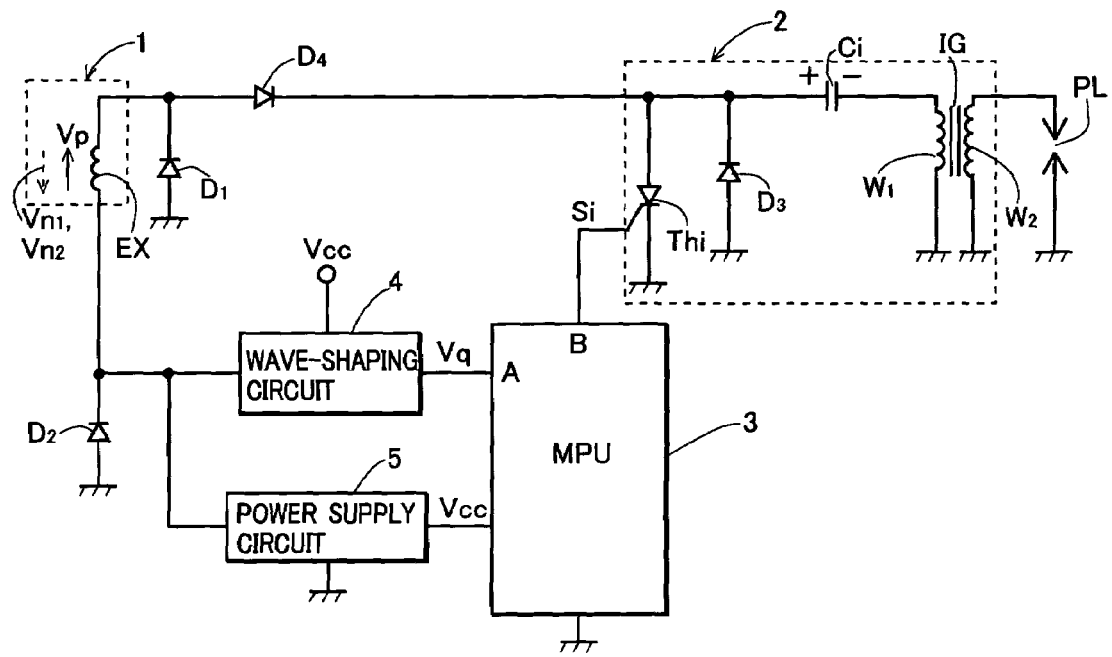
FIG. 1 is a circuit diagram showing an exemplary hardware construction of an ignition device according to the present invention.

FIG. 1 schematically shows a hardware construction of this embodiment, in which a reference numeral 1 denotes a magneto generator driven by an internal combustion engine (not shown); 2 denotes a capacitor-discharge-type ignition circuit; 3 denotes a microprocessor; 4 denotes a wave-shaping circuit; and 5 denotes a power supply circuit for supplying power supply voltage Vcc to the microprocessor 3 and the wave-shaping circuit 4.

Figure 2A:
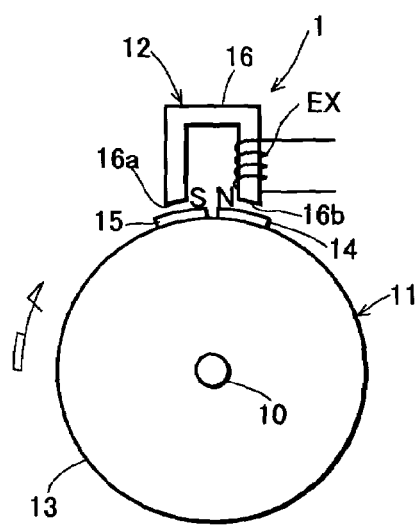
FIGS. 2A and 2B are different exemplary constructions of magneto AC generators that can be used in the present invention.

The magneto AC generator 1 used in this embodiment has a construction as shown in FIG. 2A. The magneto AC generator 1 shown in FIG. 2A comprises a magnetic rotor 11 mounted to a crankshaft 10 of the internal combustion engine (not shown), and a stator 12. The magnetic rotor 11 comprises a flywheel 13 of aluminum mounted to the crankshaft 10, permanent magnets 14 and 15 that are cast into the flywheel 13 with the magnets being magnetized in radial directions of the flywheel and exposing N-pole and S-pole to the outside, respectively, and a magnetic-circuit forming member (not shown) that are cast into the flywheel 13 together with the permanent magnets 14 and 15 to connect between the S-pole of the permanent magnet 14 and N-pole of the permanent magnet 15. The stator 12 comprises a U-shape armature core 16 having at both ends thereof, poles 16a and 16b opposing to the poles of magnets 14 and 15, and an exciter coil EX wound around the armature core 16, and is fixed to a stator mounting part provided in a case or cover of the internal combustion engine.

The exciter coil EX, during forward rotation of the internal combustion engine, generates once for every one rotation of the crankshaft of the engine, an AC voltage having a positive half-wave voltage Vp1 and first and second negative voltages Vn1 and Vn2 present, respectively, before and after the positive half-wave voltage. The exciter coil EX used in this embodiment also generates a positive half-wave voltage Vpo having a peak value lower than that of the positive half-wave voltage Vp1, prior to the first negative half-wave voltage Vn1. In this embodiment, the mounting position of the stator 12 is set so that the second negative half-wave voltage Vn2 is generated at a position substantially advanced in angle from the top dead center position of the engine (a crank angle position when the piston reaches the top dead center) TDC.

One terminal of the exciter coil is connected to a cathode of a diode D1 of which anode is grounded, while the other terminal of the exciter coil is connected to a cathode of a diode D2 of which anode is also grounded. The ignition device 2 shown in FIG. 1 comprises an ignition coil IG having a primary coil W1 and a secondary coil W2 with one terminal of each coil being grounded, an ignition capacitor Ci with one terminal thereof being connected to the not-grounded terminal of the primary coil of the ignition coil IG, a thyristor Thi as a discharge switch, connected between the other terminal of the ignition capacitor Ci and the ground with its cathode directed to the ground, and a diode D3 connected in an antiparallel manner to both terminals of the thyristor Thi to extend the discharge time for ignition spark. One terminal of the exciter coil is connected to the other terminal of the ignition capacitor Ci through a diode D4 with its anode directed to the exciter coil, and when the exciter coil outputs a positive half-wave voltage a current flows through the capacitor charging circuit from the exciter coil EX, through the diode D4, the ignition capacitor Ci, the primary coil W1 of the ignition coil, the diode D2, to the exciter coil EX, so that the ignition capacitor coil Ci is charged at the shown polarity.

A gate of the thyristor constituting the discharge switch is connected to a port B of the microprocessor 3. As described later, the microprocessor 3 obtains rotation information on the internal combustion engine from the negative half-wave voltage of the exciter coil EX to determine an ignition position of the internal combustion engine (a crank angle position at which ignition is performed), and provides an ignition signal Si to the gate of the thyristor Thi from the port B upon detection of the determined ignition position. When the thyristor Thi receives the ignition signal Si, the thyristor Thi becomes in conducting state to discharge electrical charges stored in the ignition capacitor Ci through the primary coil W1 of the ignition coil, so that a high voltage is induced across the primary coil of the ignition coil IG and the voltage is then further boosted according to the boosting ratio between the primary and secondary sides of the ignition coil to induce a high voltage across the secondary coil W2 of the ignition coil. This high voltage is applied to a spark plug PL mounted to a cylinder of the internal combustion engine so that the spark plug generates spark discharge to ignite the engine.

In this embodiment, the internal combustion engine is of single-cylinder type for simplicity. In the case of an engine of multi-cylinder type, it is possible that a number of ignition circuits 2 are provided with the number equal to the number of cylinders, and a number of stators each having the exciter coil EX is provided with the number equal to the number of cylinders; the ignition capacitor of the ignition circuit for each cylinder is charged with positive half-wave voltage outputted from the exciter coil for each cylinder, and the exciter coil for each cylinder provides rotation information for each cylinder to the microprocessor 3, which in turn provides an ignition signal to a thyristor of the ignition circuit for each cylinder at an ignition position for each cylinder. In the case of an internal combustion engine of two-cylinder type, a construction of simultaneous ignition coil may be employed in which one terminal and the other terminal of the secondary coil W2 of the ignition coil IG are connected to the respective not-grounded terminals of the spark plugs for different cylinders, and spark discharges occur at the same time at the spark plugs of the two cylinders of the engine.

The power supply circuit 5 comprises a circuit for charging a power supply capacitor with the negative half-wave voltage outputted from the exciter coil EX, and a regulator for controlling the voltage across the power supply capacitor at a constant value, and supplies power supply voltages to the microprocessor 3 and the wave-shaping circuit 4.

The wave-shaping circuit 4 shown in FIG. 1 is a circuit for converting the negative half-wave voltages Vn1 and Vn2 outputted from the exciter coil EX to a signal recognizable by the microprocessor 3, and the wave-shaping circuit 4 in this embodiment, as shown in FIG. 4B, shapes the waveform of the negative half-wave voltage generated by the exciter coil EX to a rectangular signal Vq which is comprised of a low level (L level) sustained for the period where either the negative half-wave voltage Vn1 or Vn2 is generated, and a high level (H level) sustained for the periods where neither the negative half-wave voltage Vn1 nor Vn2 is generated, and inputs the falling of the rectangular wave signal Vq as a crank signal to a port A of the microprocessor 3. Such a rectangular signal can be obtained, for example, across switch means that sustains the on-state only during the generation of either the negative half-wave voltage Vn1 or Vn2.

The rectangular wave signal Vq is a signal that falls either at the generating position of the first negative half-wave voltage Vn1 or at the generating position of the second negative half-wave voltage Vn2 outputted from the exciter coil, and rises at the position of extinction of either the first negative half-wave voltage Vn1 or the second negative half-wave voltage Vn2.

In this embodiment, rotation information on the engine is obtained by the microprocessor recognizing as a crank signal, the falling of the rectangular wave signal Vq that appears twice during one rotation of the crankshaft of the engine.

Reference characters CRin and CRout are respectively assigned to the generating position of the first negative half-wave voltage Vn1 (the generating position of first crank signal) and the generating position of the second negative half-wave voltage Vn2 (the generating position of second crank signal) so as to differentiate the positions of generation of the two negative half-wave voltages (the positions of generation of crank signals).

In this embodiment, the generating position CRin of the first negative half-wave voltage is employed as the reference crank angle position for determining the timing to perform the acquisition of time data for determining the rotational speed of the engine and the starting of measurement of ignition position in steady-state operation period of the engine, and the generating position CRout of the second negative half-wave voltage is employed as the position for starting the measurement of the ignition position in starting period of the engine.

Figure 3:
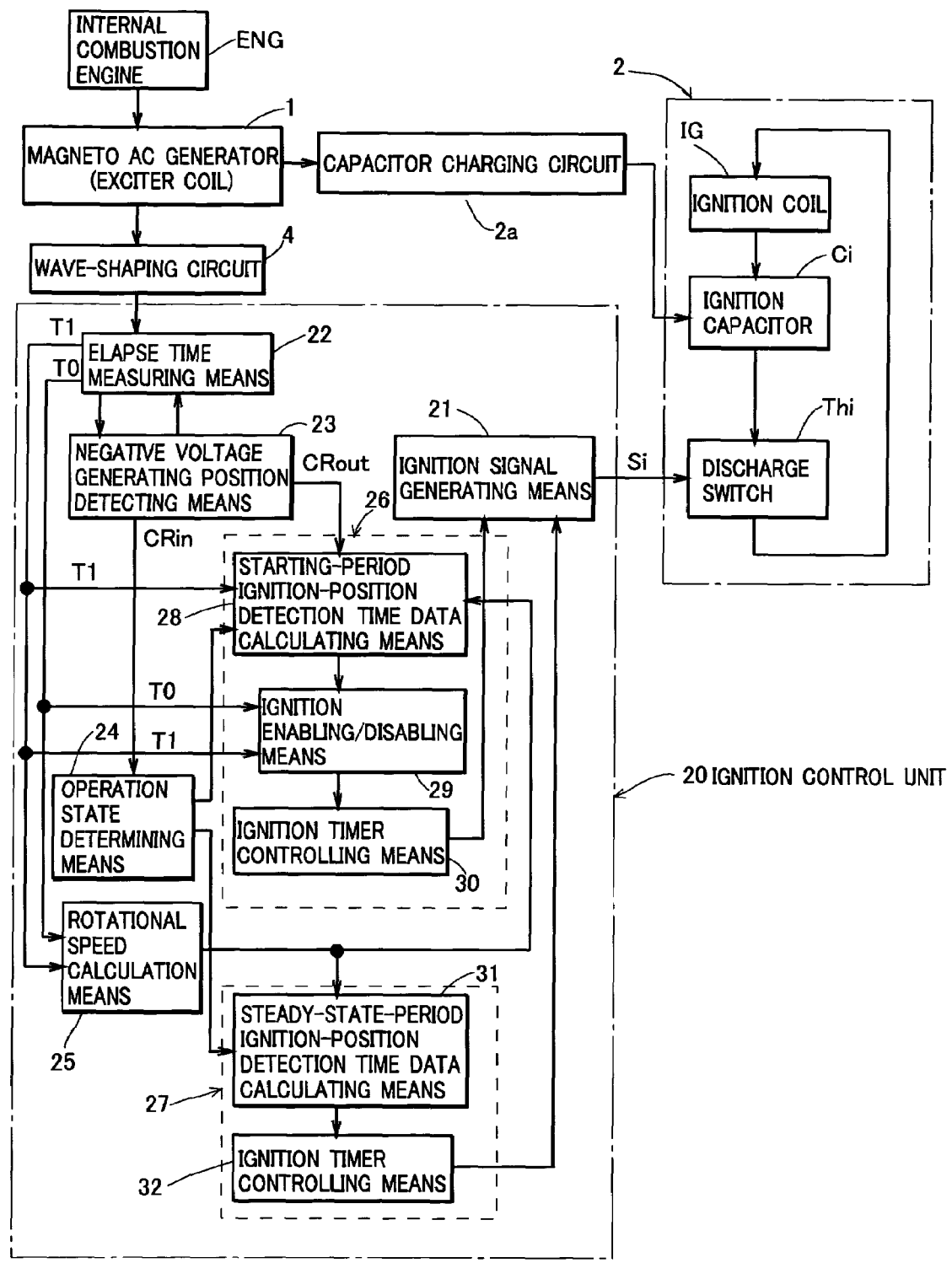
FIG. 3 is a block diagram showing a general construction including the construction of an ignition control unit of an embodiment of the present invention.

The microprocessor 3 provides, through execution of predetermined programs, various means required for the construction of an ignition control unit for supplying an ignition signal to the discharge switch at the ignition position of the internal combustion engine. FIG. 3 shows a block diagram showing an exemplary construction of the ignition control unit. In FIG. 3, 1 denotes the magneto AC generator driven by an internal combustion engine ENG and comprised as shown FIG. 2A; 2 denotes the ignition circuits having the ignition coil IG, the ignition capacitor Ci, and the discharge switch comprised of the thyristor, Thi; and 2a denotes a capacitor charging circuit for charging the ignition capacitor Ci with the positive half-wave voltage of the exciter coil.

A reference numeral 20 denotes an ignition control unit, which comprises: ignition signal generating means 21 that has an ignition timer for measuring ignition position detection time data and generates an ignition signal Si when the ignition timer completes the measurement of ignition position detection time data; elapse time detecting means 22 for detecting the elapse time from the detection of previous falling of rectangular wave signal Vq outputted from the wave-shaping circuit 4 (crank signal) to the detection of current falling (crank signal); negative voltage generating position detecting means 23 for detecting the generating position CRin of the first negative half-wave voltage Vn1 and the generating position CRout of the second negative half-wave voltage Vn2; operation state determining means 24 for determining whether the internal combustion engine is in a state of starting period or in a state of steady-state operation period; rotational speed calculation means 25 for arithmetically operating the rotational speed of the internal combustion engine from detection period T2 which is a time interval of the detection of the generating position CRin of the first negative half-wave voltage Vn1; starting-period ignition controlling means 26 for controlling the generating position of ignition signal when the operation state determining means 24 determines that the internal combustion engine is in a state of starting period; and steady-state-operation-period ignition controlling means 27 for controlling the generating position of ignition signal when the operation state determining means 24 determines that the internal combustion engine is in a state of steady-state operation period.

The elapse time measuring means 22 reads the measurement value of the timer in the microprocessor upon each detection of falling of rectangular wave signal Vq outputted from the wave-shaping circuit 4, and detects the time period from the detection of previous falling of the rectangular wave signal Vq (CRin or CRout) to the detection of current falling (CRin or CRout).

The negative voltage generating position detecting means 23 is means that detects the generating position CRin of the first negative half-wave voltage Vn1 and the generating position CRout of the second negative half-wave voltage Vn2, depending on which is longer or shorter, time period T1 between the detection of the generating position CRin of the first negative half-wave voltage Vn1 and the detection of the generating position CRout of the second negative half-wave voltage Vn2, or time period T0 between the detection of the generating position CRout of the second negative half-wave voltage Vn2 and the detection of the generating position CRin of the next first negative half-wave voltage Vn1.

The negative voltage generating position detecting means 23, as shown in FIG. 4, compares time period Told previously detected by the elapse time measuring means with time period Tnew currently detected, then detects that the current position of falling of the rectangular wave signal is at the generating position of the first negative half-wave voltage Vn1 if the relation Tnew<Told/k (k is a constant equal to or more than 1) is not met, and detects that the current position of falling of the rectangular wave signal is at the generating position of the second negative half-wave voltage Vn2 if the relation Tnew<Told/k is met. The elapse time measuring means 22 recognizes that the currently obtained elapse time is T0 if the negative voltage generating position detecting means 23 detects the generating position of the first negative half-wave voltage (crank signal CRin), and recognizes that the currently obtained elapse time is T1 if the negative voltage generating position detecting means 23 detects the generating position of the second negative half-wave voltage (crank signal CRout).

The operation state determining means 24 is comprised so as to detect the rotation count of the crankshaft of the engine after the starting operation of the internal combustion engine has begun, Pulse-cnt, from the number of detections of the generating position of the first negative half-wave voltage Vn1 (CRin), then determine that the internal combustion engine is in a state of starting period if the rotation count Pulse-cnt is equal to or less than set value STARTNUM (Pulse-cnt≦STARTNUM), and determine that the internal combustion engine is in a state of steady-state operation period if the rotation count of the crankshaft of the engine after the starting operation of the internal combustion engine has begun, Pulse-cnt is more than set value STARTNUM (STARTNUM<Pulse-cnt).

The rotational speed calculation means 25, upon every detection of the generating position CRin of first negative half-wave voltage, adds the time periods T0 and T1 measured by the elapse time measuring means 22 to obtain the elapse time T2 from the previous detection of the generating position CRin of first negative half-wave voltage to the current detection of the generating position CRin of first negative half-wave voltage (the cycle at which the generating position CRin of first negative half-wave voltage is detected), and arithmetically operates the rotational speed of the engine from that elapse time T2.

The starting-period ignition controlling means 26, when it is determined that the internal combustion engine is in a state of starting period, executes, upon the detection of the generating position CRout of the second negative half-wave voltage, the process to arithmetically operate, as ignition position detection time data Tigs, time period that is required for the internal combustion engine to rotate from the generating position CRout of the second negative half-wave voltage to a position suitable in starting period, θis at the rotational speed of the internal combustion engine obtained from the time period T1 between the detection of the generating position CRin of the first negative half-wave voltage Vn1 and the detection of the generating position CRout of the second negative half-wave voltage Vn2, and cause the ignition timer to start the measurement of ignition position detection time data Tigs.

The starting-period ignition controlling means 26 as shown comprises starting-period ignition-position detection time data calculating means 28 for arithmetically operating, as ignition position detection time data, Tigs, the time period that is required for the internal combustion engine to rotate from the generating position of the second negative half-wave voltage to a position suitable in starting period, ignition enabling/disabling means 29, and ignition timer controlling means 30 for setting the ignition position detection time data, Tigs in the ignition timer constituting the ignition signal generating means 21 to cause it to start the measurement thereof.

The starting-period ignition-position detection time data calculating means 28 arithmetically operates as the ignition position detection time data Tigs, the time period that is required for the internal combustion engine to rotate from the generating position of the second negative half-wave voltage to the position suitable in starting period, at the rotational speed of the internal combustion engine that is obtained from the time period T1 between the detection of the generating position CRin of the first negative half-wave voltage Vn1 and the detection of the generating position CRout of the second negative half-wave voltage Vn2, and the angle a from the generating position CRin of the first negative half-wave voltage to the generating position CRout of the second negative half-wave voltage (see FIG. 4).

The starting-period ignition position detection time data Tigs is arithmetically operated by the following equation:

$$Tigs = T1 \cdot (\theta out - \theta igs)/\alpha \qquad (1)$$

where θout represents the angle from the top dead center position TDC to the generating position CRout of the second negative half-wave voltage Vn2, and θigs represents the angle measured in the advance angle direction from the top dead center position TDC.

The enabling/disabling means 29 is means for determining whether to enable or disable the ignition operation in starting operation of the engine, and allows the ignition timer controlling means 30 to set the time data in the ignition timer to enable the generation of ignition signal in starting period if the ratio T0/T1, which is ratio of the time period T0 between the detection of the generating position CRout of the second negative half-wave voltage and the detection of the generating position CRin of the next first negative half-wave voltage to the time period T1 between the detection of the generating position CRin of the first negative half-wave voltage and the detection of the generating position CRout of the second negative half-wave voltage, is equal to or more than a set value (if the cranking speed is substantially high), and prohibits the ignition timer from being set with the time data to disable the generation of ignition signal in starting period if the ratio T0/T1 is less than the set value (if the cranking speed is too low).

In this embodiment, two ignition positions is set and stored in a ROM in advance as ignition positions suitable in starting period: an ignition position suitable for beginning starting operation (a position near the top dead center position), θigs1, and an ignition position suitable as the ignition position during transition to idling operation after the beginning of starting operation (a position slightly advanced from the top dead center position), θigs2.

The starting-period ignition-position detection time data calculating means 28 selects a suitable ignition position as θigs from the two ignition positions θig1 and θig2 that have been set as suitable positions in starting period, depending on the rotational speed arithmetically operated by the rotational speed calculation means 25, and arithmetically operates the starting-period ignition position detection time data Tigs by using equation (1). When calculating the starting-period ignition position detection time data Tigs, the ignition timer controlling means 30 immediately sets the time data Tigs in the ignition timer to cause it to start the measurement thereof.

Since the process from the acquisition of time period T1 to the calculation of the starting-period ignition position detection time data Tigs is executed instantly, the measurement of time data Tigs can be regarded to be begun at the generating position CRout of the second negative half-wave voltage Vn2. Accordingly, in starting period of the engine, an ignition signal is supplied to the thyristor Thi of the ignition circuit 2 to cause an ignition operation at crank angle position θigs at the time point after the elapse of time period represented by the starting-period ignition position detection time data Tigs from the time point at which the generating position CRout of the second negative half-wave voltage Vn2 is detected, as shown in FIG. 6.

The steady-state-operation-period ignition controlling means 27 is comprised so as to, upon the detection of the generating position of the first negative half-wave voltage, execute the process to arithmetically operate, by using an ignition position in steady-state operation period of the internal combustion engine, θign arithmetically operated based on the rotational speed of the internal combustion engine obtained from detection period T2 which is the time interval of the detection of the generating position CRin of the first negative half-wave voltage, and the detection period T2, the time period Tign required for the engine to rotate from the generating position of the first negative half-wave voltage to the arithmetically operated ignition position in steady-state operation period, θign (see FIG. 5) at the rotational speed of the internal combustion engine obtained from the detection period T2, as ignition position detection time data, and the process to cause the ignition timer to start the measurement of the ignition position detection time data, Tign.

The steady-state-operation-period ignition controlling means 27 as shown comprises steady-state-period ignition-position detection time data calculating means 31 that arithmetically operates, by using an ignition position in steady-state operation period of the internal combustion engine, θign arithmetically operated based on the rotational speed arithmetically operated by the rotational speed calculating means 25 before one rotation, and a currently measured detection period T2, the time period required for the engine to rotate from the generating position CRin of the first negative half-wave voltage to the arithmetically operated ignition position in steady-state operation period, θign at the rotational speed of the internal combustion engine obtained from the detection period T2, as the ignition position detection time data Tign, and ignition timer controlling means 32 for setting the measurement of the arithmetically operated ignition position detection time data Tign in the ignition timer constituting the ignition signal generating means 21 to cause it to start the measurement thereof.

The steady-state-operation-period ignition position detection time data Tign is arithmetically operated by using the following equation:

$$Tign = T2 \cdot (\theta in - \theta ign)/360 \qquad (2)$$

where θin represents the angle from the top dead center position TDC to the generating position CRin of the first negative half-wave voltage, and the ignition position θign represents a angle measured in advance angle direction from the top dead center position.

The ignition timer controlling means 32 sets the above-mentioned ignition position detection time data, Tign in the ignition timer constituting the ignition signal generating means 21 to cause it to start the measurement thereof. The ignition signal generating means 21, upon the completion of the measurement of the set time data Tign executed by the ignition timer, supplies an ignition signal Si to the discharge switch to cause the ignition circuit 2 to perform ignition operation.

Therefore, in steady-state operation period of the engine, ignition operation is performed by supplying ignition signal Si to the thyristor Thi of the ignition circuit at the crank angle position θign at the time point after the elapse of time period represented by the steady-state-operation-period ignition position detection time data Tign from the time point of the detection of the generating position CRin of the first negative half-wave voltage Vn1 as shown in FIG. 5. The ignition position θign depends on the variation in control conditions such as rotational speed of the engine.

In FIG. 4 to FIG. 6, θimax represents a maximum advance angle position of ignition position in steady-state operation period. The relation between the phase of the output voltage of the exciter coil and the maximum advance angle position is designed so that the instantaneous value of the positive half-wave voltage Vp1 of the exciter coil, at the maximum advance angle position θimax, is at a level capable of charging the ignition capacitor Ci to a voltage level enabling ignition operation, in order to facilitate the ignition operation at the maximum advance angle position. In this embodiment, it is designed that the peak position of the positive half-wave voltage Vp1 outputted from the exciter coil is at the maximum advance angle position.

Figure 9:
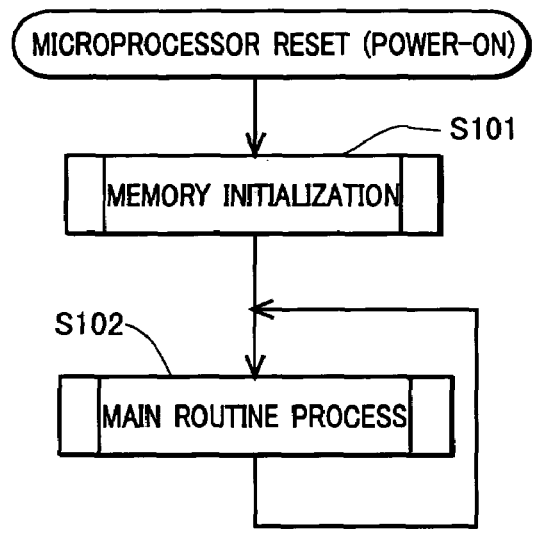
FIG. 9 is a flowchart showing an algorithm of process executed in power-on stage of a microprocessor in the embodiment illustrated in FIG. 3.

FIG. 9 to FIG. 14 show algorithms of major components of programs for the microprocessor 3 to execute in this embodiment. FIG. 9 shows an algorithm for a process executed during resetting period (power-on stage) of the microprocessor, and in this process, after the initialization of the memory at step S101, the processing proceeds to step S102 to execute a main routine.

The main routine executes, for example, calculation of the ignition position in steady-state operation period, θign with respect to rotational speed Ne arithmetically operated in CRin process in FIG. 13, described later. The calculation of the ignition position θign is executed, for example, by retrieving a map for ignition position calculation stored in ROM with respect to the rotational speed Ne and subjecting the retrieved values to interpolative arithmetic operation. Arithmetic operation for correcting the ignition position is also executed depending on other control conditions such as an opening degree of a throttle valve, if necessary.

Figure 10:
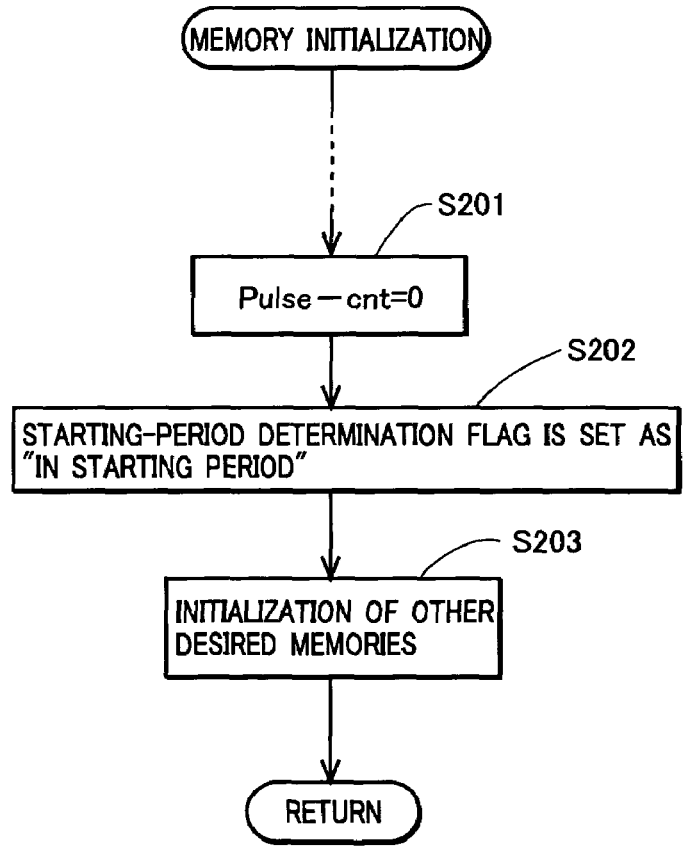
FIG. 10 is a flowchart showing an algorithm of memory initialization process executed in power-on stage of a microprocessor in the embodiment illustrated in FIG. 3.

FIG. 10 illustrates the initialization algorithm shown in FIG. 9, and at first at step S201 in this initialization algorithm, the rotation count of crankshaft of the engine after the beginning of starting operation of the internal combustion engine, Pulse-cnt is set at 0. In this embodiment, the number of detections of the generating position of the first negative half-wave voltage Vn1 (CRin) is counted as the rotation count Pulse-cnt. After the setting of the rotation count Pule-cnt at 0, a starting-period determination flag is set as "in starting period" at step S202, and other memories are initialized at step 203.

Figure 11:
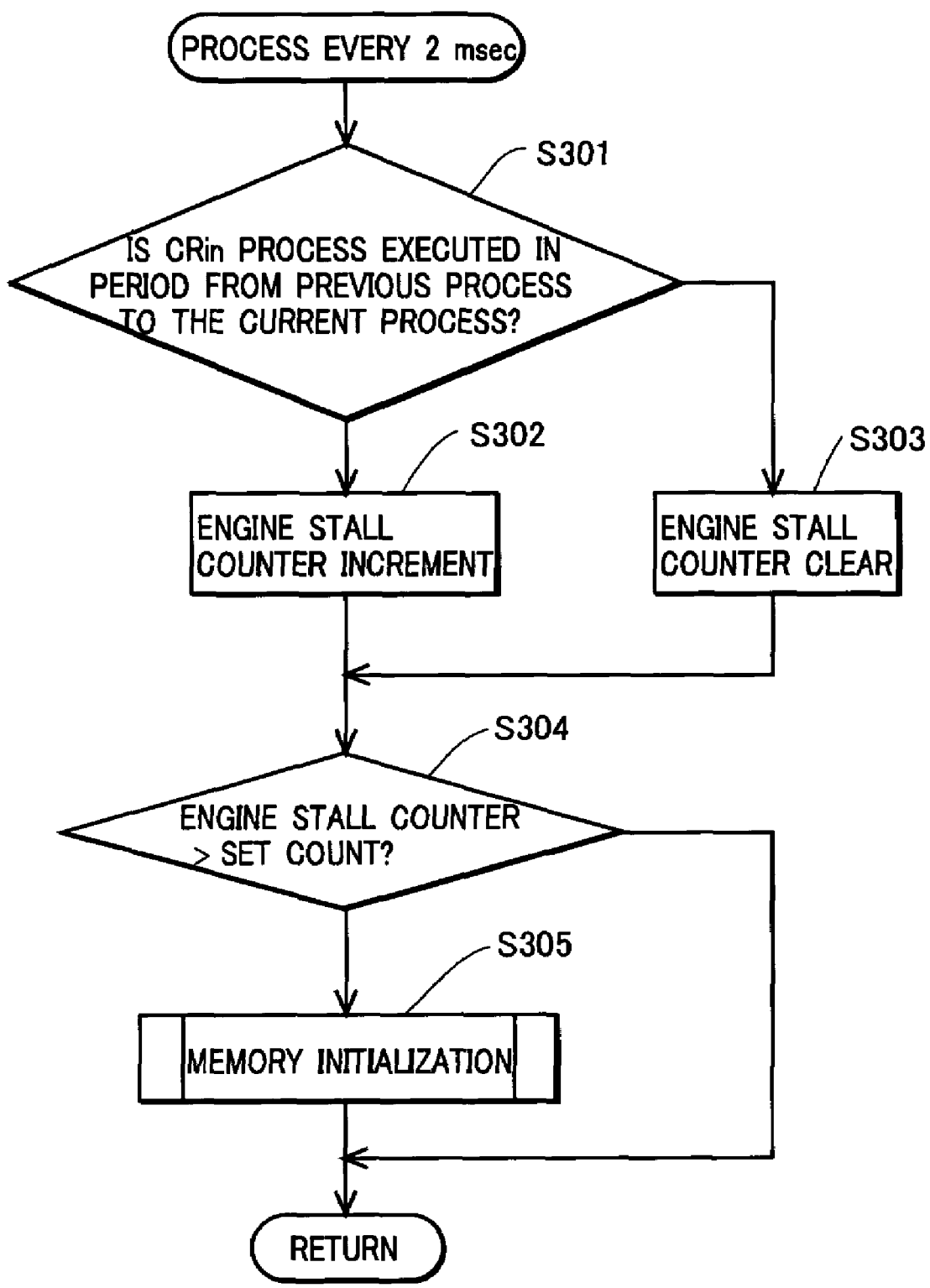
FIG. 11 is a flowchart showing an algorithm of process executed every 2 msec by a microprocessor in the embodiment illustrated in FIG. 3.

FIG. 11 shows an algorithm of an executed-by-2 msec process executed for every 2 msec by the microprocessor to determine whether the internal combustion engine is stalled or not (an engine-stall-time memory initialization process), and at first at step 301 in this process, it is determined whether the CRin process described later has been executed or not in the period from the previous executed-by-2 msec process to the current executed-by-2 msec process. Consequently, if it is determined that no CRin process has been performed in the period from the previous executed-by-2 msec process to the current executed-by-2 msec process, the processing proceeds to step S302 where the count value of an engine stall counter for counting the number of engine stalls is incremented. On the other hand, if it is determined at step S301 that a CRin process has been performed in the period from the previous executed-by-2 msec process to the current executed-by-2 msec process, the processing proceeds to step S303 where the count value of an engine stall counter is cleared. After the execution of step S302 or S303, the processing proceeds to step S304 where it is determined whether the count value of the engine stall counter exceeds a set count or not, and if the count value does not exceed the set count, it is then determined that the engine is not stalled, and the processing returns to the main routine. On the other hand, if it is determined that the count value of the engine stall counter exceeds the set count at step S304, the processing proceeds to step S305 to execute the memory initialization process as shown in FIG. 10 and then returns to the main routine.

Figure 12:
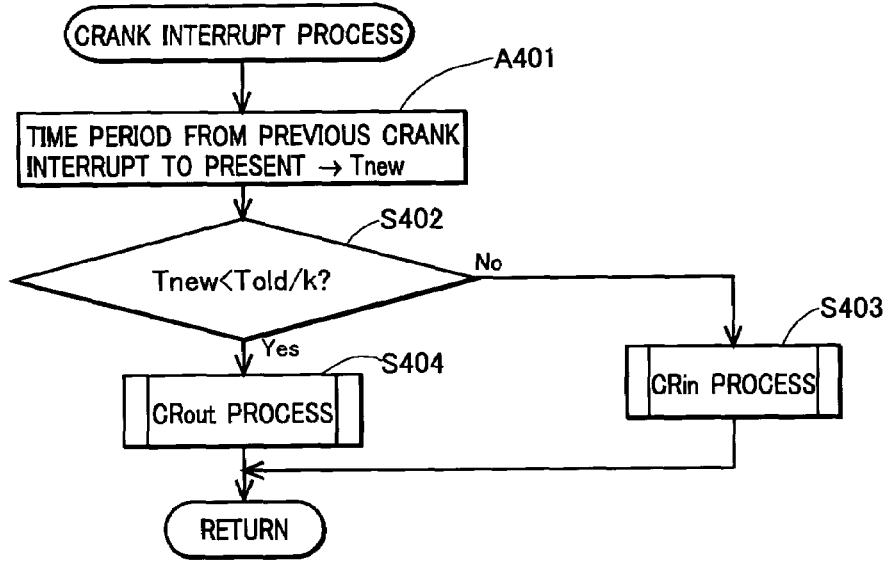
FIG. 12 is a flowchart showing an algorithm of crank interrupt process executed by a microprocessor upon every detection of generating position of a negative half-wave voltage outputted from an exciter coil in the embodiment illustrated in FIG. 3.
Figure 14:
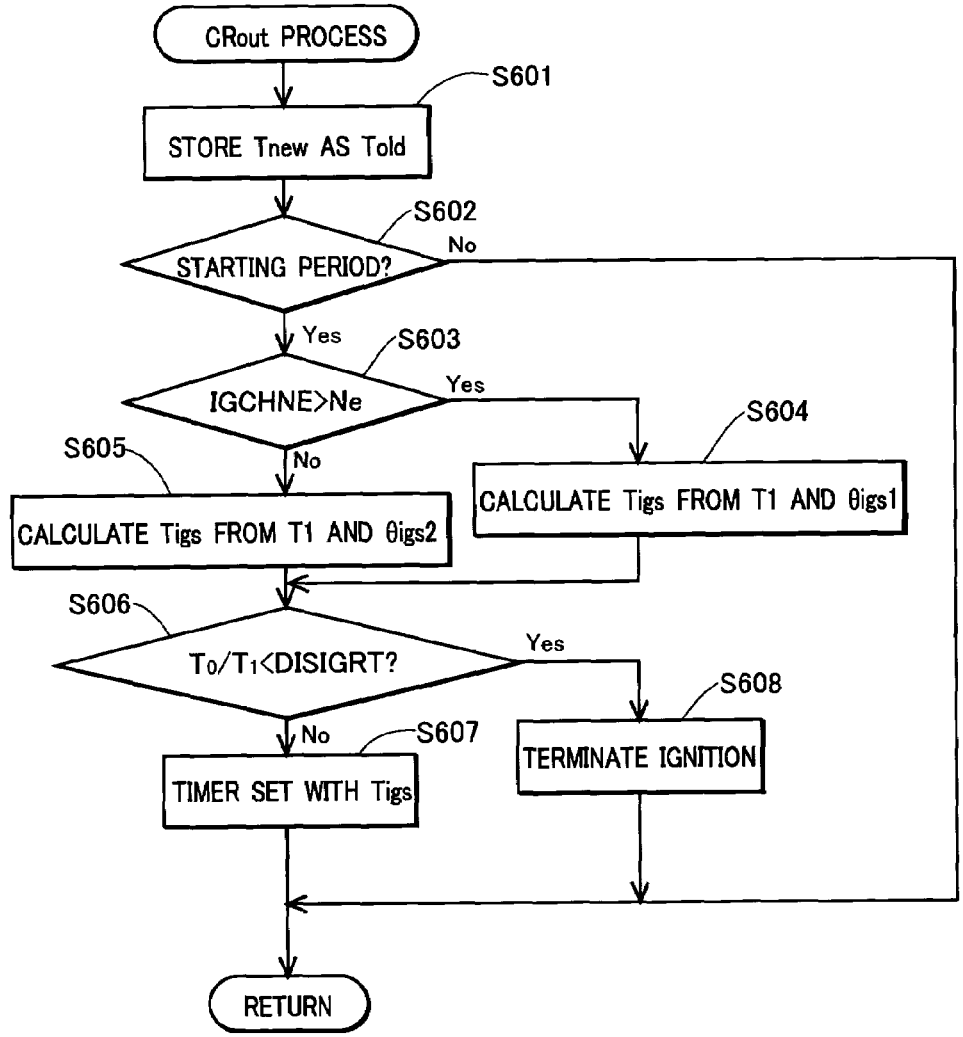
FIG. 14 is a flowchart showing an algorithm of CRout process executed by a microprocessor upon every detection of generating position CRout of a second negative half-wave voltage outputted from an exciter coil in the embodiment illustrated in FIG. 3.
Figure 13:
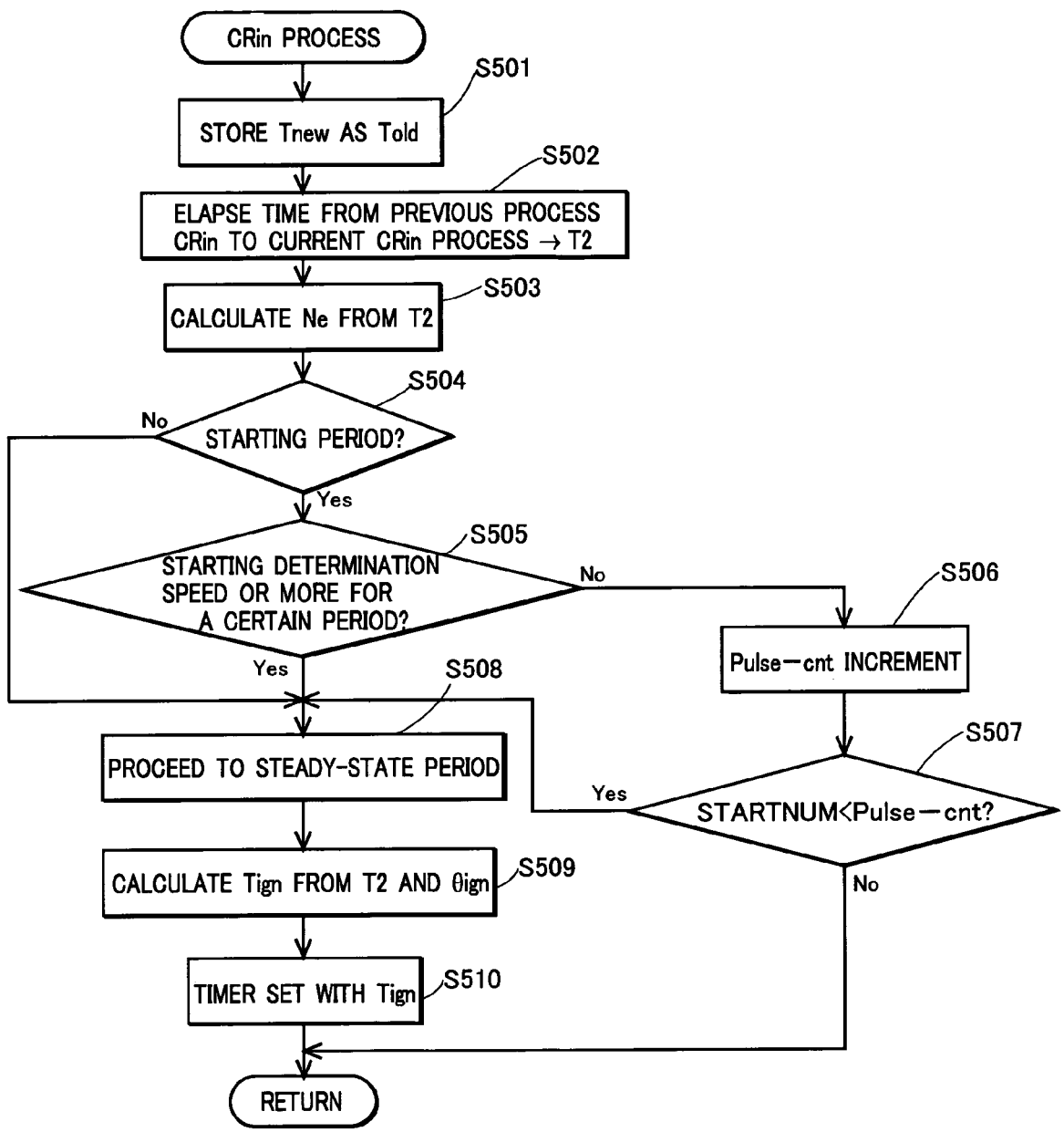
FIG. 13 is a flowchart showing an algorithm of CRin process executed by a microprocessor upon every detection of generating position CRin of a first negative half-wave voltage outputted from an exciter coil in the embodiment illustrated in FIG. 3.
Figure 15:
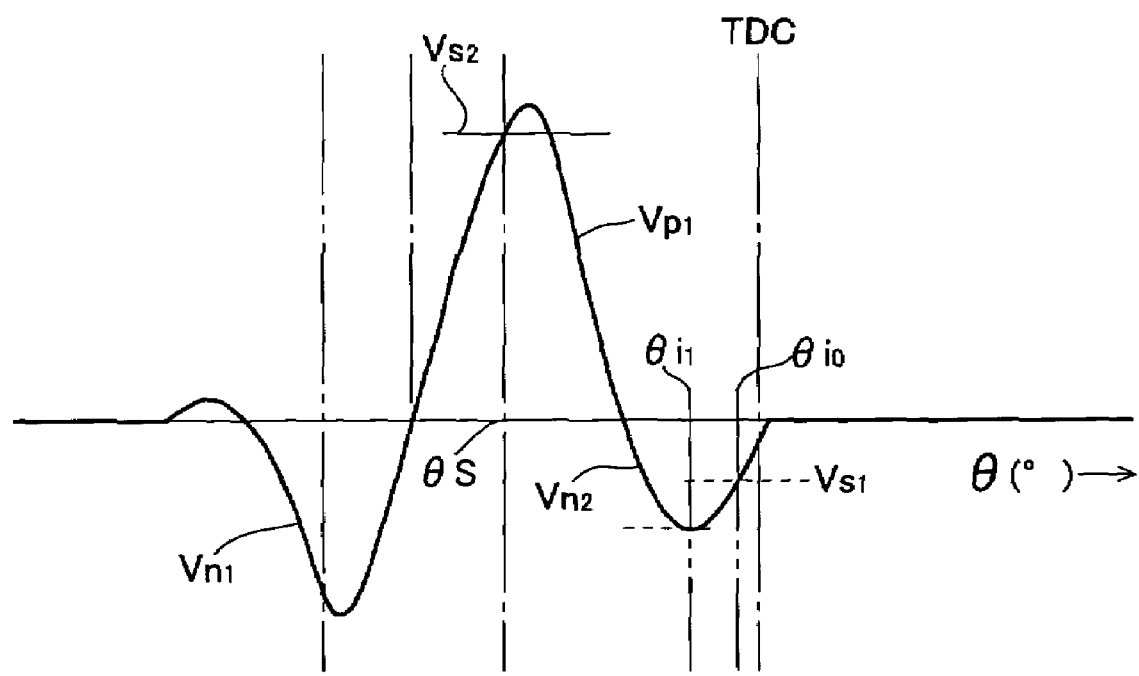
FIG. 15 is a waveform chart showing a waveform of output voltage of an exciter coil, used for illustrating operation of a conventional ignition device.

FIG. 12 shows a crank interrupt process that is executed by the microprocessor upon every detection of rising of the rectangular wave signal outputted from the wave-shaping circuit 4, and FIG. 13 shows CRin process that is executed when the generating position CRin of the first negative half-wave voltage is detected, in the crank interrupt process of FIG. 12. FIG. 14 shows CRout process that is executed when the generating position CRout of the second negative half-wave voltage is detected, in the crank interrupt process of FIG. 12.

If a crank signal is inputted to the microprocessor 3 either at the generating position CRin of the first negative half-wave voltage, or if a crank signal is inputted to it at the generating position CRout of the second negative half-wave voltage, the main routine is interrupted and the crank interrupt process shown in FIG. 12 is started. In the step of this interrupt process, S401, the time period from the previous crank interrupt process to the current crank interrupt process (inter-crank-signal elapse time) is stored as Tnew in RAM. Then, the processing proceeds to the step S402, where the currently measured inter-crank-signal elapse time Tnew is compared with time value Told/k that is obtained by multiplying 1/k and the time value that is measured and stored as well in the previous crank interrupt process and regarded as Told. As the result of the comparison, if it is determined that Tnew<Told/k is not met (Tnew≧Told is met), it is then determined that the crank angle position from which the current interrupt process has been started is the generating position of the first negative half-wave voltage (the currently generated crank signal is the first crank signal CRin), and the processing proceeds to step S403 to execute the CRin process shown in FIG. 13. If it is determined that Tnew<Told/k is met in step S402, it is then determined that the crank angle position from which the current interrupt process has been started is the generating position of the second negative half-wave voltage (the currently generated crank signal is the second crank signal CRout), and the processing proceeds to step S404 to execute the CRout process shown in FIG. 14. After the completion of either the CRout process or the CRin process, the interrupt process is terminated.

In the CRin process of FIG. 13, at first, the time period Tnew measured at step S401 of the interrupt process of FIG. 12 is stored as Told at step S501, and an elapse time from the previous process CRin to the current CRin process is arithmetically operated as T2 at step S502. Then, an rotational speed Ne of the engine is arithmetically operated from the elapse time T2 (the time period required for one rotation of the crankshaft) at step S503, and it is determined at step S504 whether the starting-period determination flag is set as "in starting period" or not, and if it is set as "in starting period", the processing proceeds to step 505 to determine whether or not a state where the rotational speed of the engine is equal to or higher than a starting determination speed SNCHNE has continued a certain period. Consequently, if a state where the rotational speed of the engine is equal to or higher than the starting determination speed has not continued a certain period, the processing proceeds to step S506 where the rotation count of the crankshaft after the beginning of starting operation of the engine, Pulse-cnt is incremented by 1, and then at step S507, it is determined whether the rotation count Pulse-cnt exceeds a set count. STARTNUM or not. Consequently, if the rotation count Pulse-cnt does not exceed the set count STARTNUM, no process is executed thereafter and the CRin process is terminated to return to the main routine.

Either if it is determined that the starting-period determination flag is not set as "in starting period" at step S504, or if it is determined that a state where the rotational speed of the engine is equal to or higher than a starting determination speed SNCHNE has continued a certain period at step S505, or if it is determined that the rotation count Pulse-cnt exceeds the set count STARTNUM at step S507, the processing proceeds to step S508 to reset the starting-period determination flag (set it as not "in starting period"), and proceeds to a steady-state ignition control. In the ignition control in steady-state period, ignition position detection time data, Tign is, at step S509, arithmetically operated by using the equation (2) together with the elapse time during one rotation of the crankshaft, T2 measured at step S502, the rotational speed Ne arithmetically operated in the previous CRin process, and the ignition position in steady-state operation period, θign arithmetically operated in the main routine, and that time data Tign is set in the ignition timer at step S510 to cause it to start the measurement thereof. Upon completion of the measurement of the set time data by the ignition timer, an interrupt process (not shown) is executed to supply an ignition signal to the discharge switch of the ignition circuit.

As described above in this embodiment, even in the case where the rotational speed of the engine does not reach the starting determination speed, if it is determined that the rotation count of the crankshaft after the beginning of starting operation, Pulse-cnt exceeds the set count START-NUM, then it is determined that the engine is not in a state of starting period and ignition operation is performed at the ignition position arithmetically operated with respect to the rotational speed.

Next, in CRout process of FIG. 14, at first, the currently measured inter-crank-signal elapse time Tnew is stored as the previously measured inter-crank-signal elapse time Told, at step S601. Then, the processing proceeds to step S602, and it is determined whether the starting-period determination flag is set as "in starting period" or not, and if it is determined that the starting-period determination flag is set as "in starting period" (if it is determined that the engine is in a state of starting period), the processing proceeds to step S603 where it is determined whether the arithmetically operated rotational speed Ne is less than an set rotational speed IGCHNE or not. Consequently, if it is determined that the rotational speed Ne is less than the set rotational speed IGCHNE, the processing proceeds to step S604 where ignition position detection time data in starting period, Tigs is arithmetically operated by using the elapse time from the detection of the generating position of the first negative half-wave voltage to the detection of the generating position of the second negative half-wave voltage, T1 (inter-crank-signal elapse time measured in starting of the crank interrupt process of FIG. 12), and a first ignition position for starting period, θigs1 that is set near the top dead center position of the engine. On the other hand, if it is determined that the rotational speed Ne is equal to or more than the set rotational speed IGCHNE at step S603, the processing proceeds to step S605 where ignition position detection time data in starting period, Tigs is arithmetically operated by using the elapse time T1 and a second ignition position for starting period, θigs2 that is set at a position slightly advanced in angle from the top dead center position of the engine (at an ignition position suitable as an ignition position in idling rotation).

After the execution of step S604 or S605, the processing proceeds to step S606 where it is determined whether or not T0/T1, the ratio of the time period T0 between the detection of the generating position of the second negative half-wave voltage and the detection of the generating position of the next first negative half-wave voltage to the time period T1 between the detection of the generating position of the first negative half-wave voltage and the detection of the generating position of the second negative half-wave voltage, is less than a set value DISIGRT. Consequently, if it is determined that the ratio T0/T1 is not less than the set value DISIGRT, the processing proceeds to step S607 to set the time data Tigs arithmetically operated at step S604 or S605 in the ignition timer, and the CRout process is terminated. If it is determined that the ratio T0/T1 is less than the set value DISIGRT, the processing proceeds to step S608 to prohibit the time data Tigs arithmetically operated at step S604 or S605 from being set in the ignition timer and terminate the ignition operation, and the CRout process is then terminated. If it is determined that the starting-period determination flag is not set as "in starting period", then no process is executed thereafter and the CRout process is terminated.

In this embodiment, the elapse time detecting means 22 shown in FIG. 3 is comprised of step S401 of the interrupt process of FIG. 12, and the negative voltage generating position detecting means 23 is comprised of step S402 of the interrupt process of FIG. 12. The operation state determining means 24 is comprised of step S202 of the initialization process of FIG. 10, steps S504, S505, S506 and S507 of the CRin process of FIG. 13, and steps S602 and S603 of CRout process of FIG. 14, and the rotational speed calculation means 25 is comprised of step S503 of the CRin process of FIG. 13.

The starting-period ignition-position detection time data calculating means 28 is comprised of step S605 of the CRout process of FIG. 14, and the ignition enabling/disabling means 29 is comprised of steps S606 and S608 of the CRout process of FIG. 14. The ignition timer controlling means 30 is comprised of step S607 of the CRout process of FIG. 14. The steady-state-period ignition-position detection time data calculating means 31 is comprised of step S509 of the CRin process of FIG. 13, and the ignition timer controlling means 32 is comprised of step S510 of FIG. 13.

As described above, in the ignition device of this embodiment, after starting operation of the engine has begun, at first, the generating position CRin of the first negative half-wave voltage and the generating position CRout of the second negative half-wave voltage are identified by using comparison between inter-crank-signal elapse times; it is then determined whether the internal combustion engine is in a state of starting period or a state of steady-state operation period, and if it is determined that the internal combustion engine is in a state of starting period, ignition position detection time data in starting period of the engine, Tigs is obtained by using information on the rotational speed of the engine obtained from the elapse time T1 measured at the generating position CRout of the second negative half-wave voltage Vn2 (the elapse time from the detection of the generating position CRin of the first negative half-wave voltage to the detection of the generating position CRout of the second negative half-wave voltage), and the measurement of the time data Tigs is then immediately started to detect the ignition position in starting period so as to generate an ignition signal in starting period.

With such a construction, in starting period where the rotational speed of the crankshaft of the engine rapidly varies, since the ignition position in starting period can be detected based on rotational speed information of the engine obtained just before the ignition position in starting period, the ignition position in starting period can be accurately detected thereby improving the starting capability of the engine.

With such a construction described above, since the ignition position of the engine in starting period can be set at a position that is further delayed from the generating position CRout of the second negative half-wave voltage (a position advanced away from the section where the exciter coil generates AC voltage), the advance angle width of the ignition position can be increased.

In the state where it is determined that the engine is in a state of starting period, the enabling/disabling means compares a set value and the ratio T0/T1, which is ratio of the time period T0 between the detection of the generating position CRout of the second negative half-wave voltage and the detection of the generating position CRin of the next first negative half-wave voltage to the time period T1 between the detection of the generating position CRin of the first negative half-wave voltage and the detection of the generating position CRout of the second negative half-wave voltage, and then enables the generation of ignition signal in starting period if the ratio T1/T0 equal to or more than a set value (if the cranking speed is adequate), and disables the generation of ignition signal in starting period if the ratio T0/T1 is less than the set value (if the cranking speed is not adequate). Accordingly, it is possible to prohibit the ignition operation from being disabled when the cranking speed is low due to lack of operation power after the beginning of starting operation, thereby preventing the occurrence of phenomenon where the piston cannot move over the top dead center in starting of the engine by human power and is pushed back (kettin), so as to improve the safety. The set value compared with the above-mentioned ratio of elapse times T0/T1 is set at a value such that the relation T0/T1<the set value is met when the cranking speed is so low that kettin may occur.

The ignition enabling/disabling means may be comprised so as to enable the generation of ignition signal in starting period if the time period T1 between the detection of the generating position CRin of the first negative half-wave voltage and the detection of the generating position CRout of the second negative half-wave voltage is equal to or less than a set value, and disable the generation of ignition signal in starting period if the time period T1 is more than the set value.

In this embodiment, either if it is determined that the engine has completed starting operation and is in a state of steady-state operation, or if it is determined that the engine has not completed starting operation but the rotation count after the beginning of starting operation Pulse-cnt exceeds the set count STARTNUM, then, the time period required for the engine to rotate from the reference crank angle position to the ignition position in steady-state operation (arithmetically operated with respect to control conditions including the rotational speed arithmetically operated one-rotation before), θign, by using the cycle of detection of the generating position of the first negative half-wave voltage, T2 measured at the generating position CRin of the first negative half-wave voltage (the reference crank angle position), and the ignition timer is then caused to measure the time data to generate an ignition signal. Accordingly, in a state of steady-state operation of the engine, the engine is ignited at the ignition position that is arithmetically operated with respect to the rotational speed and corrected with respect to other conditions if necessary.

In this embodiment, as described above, since two ignition positions for starting period is provided as suitable ignition positions in starting period: a first ignition position for starting period θigs1 that is near the top dead center position, and a second ignition position for starting period θigs2 that is advanced in angle from the first ignition position for starting period (a ignition position suitable as an ignition position in idling rotation), and the ignition-position switching rotational speed at which these ignition positions for starting period are switched, IGCHNE and the starting determination speed with which it is determined whether the engine is in a state of starting period operation or not, SNCHNE are set so that ignition operation is performed at the first ignition position for starting period θigs1 near the top dead center position when IGCHNE<rotational speed is met and ignition operation is performed at the second ignition position for starting period θigs2 when IGCHNE<rotational speed<SNCHNE is met, it is possible to prevent the occurrence of kettin due to the pulsation of cranking in the case of starting the engine by performing cranking by using a starter motor. However, the present invention is not limited to the case where a plurality of ignition positions for starting period are provided as described above, and it is also possible that only a single ignition position suitable for starting period is provided at a position near the top dead center position.

The magneto AC generator 1 used in this embodiment generates another positive half-wave voltage Vpo having a peak value lower than the positive half-wave voltage just before the exciter coil generates the first negative half-wave voltage Vn1 during forward rotation of the internal combustion engine. When the exciter coil generates AC voltage of such waveform, there is a possibility that ignition operation is performed even in case of reverse rotation of the engine so that the engine rotates in the reverse direction, since two negative half-wave voltage are generated to provide rotation information of the engine to the ignition control unit even in case of reverse rotation.

In the case of the magneto AC generator having the above described construction, in order to prevent the reverse rotation of the engine, it is possible that the wave-shaping circuit 4, as shown in FIG. 7, comprises a filter 4a comprised of a parallel circuit of a capacitor for filter, C1 and a resistor R1, and switch means 4b which is in an on-state when the inputted negative half-wave voltage exceeds the voltage across the capacitor for filter, and across which a rectangular wave signal is generated, wherein the discharge time constant of the capacitor for filter, C1, is set so that the switch means changes from an off-state to the on-state upon every generation of each of the two negative half-wave voltage from the exciter coil EX during forward rotation of the internal combustion engine, while, during reverse rotation of the engine, the switch means changes from the off-state to the on-state upon the generation of initial negative half-wave voltage but maintains the off-state upon the generation of secondary negative half-wave voltage.

In the example shown in FIG. 7, one terminal of the filter 4a comprised of the parallel circuit of the capacitor for filter, C1 and the resistor R1 is connected to the connecting point of the exciter coil EX and the diode D2 through a diode D5 of which cathode is directed to the filter, and a resistor R2 is connected between the other terminal of the filter 4a and the ground. The other terminal of the filter 4a is connected to a base of NPN transistor TR1 of which emitter is grounded, and a collector of the transistor TR1 is connected to a positive output terminal of the power supply circuit 5 through a resistor R3. The switch means is comprised of the transistor TR1, and when a base current is supplied to the transistor TR1 to turn on the transistor, the potential of the collector of the transistor lowers from the level of power supply voltage Vcc to about the ground potential. Accordingly, rectangular wave signal Vq is provided that falls upon every generation of the negative half-wave voltage of the exciter coil in the collector of the transistor TR1. The other construction of the ignition circuit shown in FIG. 7 is same as that shown in FIG. 1.

In the ignition device shown in FIG. 7, the capacitor C1 is charge with the negative half-wave voltage inputted from the exciter coil EX through the diode D5, and the electrical charges in the capacitor C1 are discharged through the resistor R1. With the provision of the filter in the input stage of the wave-shaping circuit as described above, base current does not flows to the transistor TR1 unless the negative half-wave voltage outputted from the exciter coil exceeds the voltage across the capacitor C1, thereby preventing the transistor TR1 from turning on due to noise voltage induced in the exciter coil to input error signal to the microprocessor.

Figure 8A:
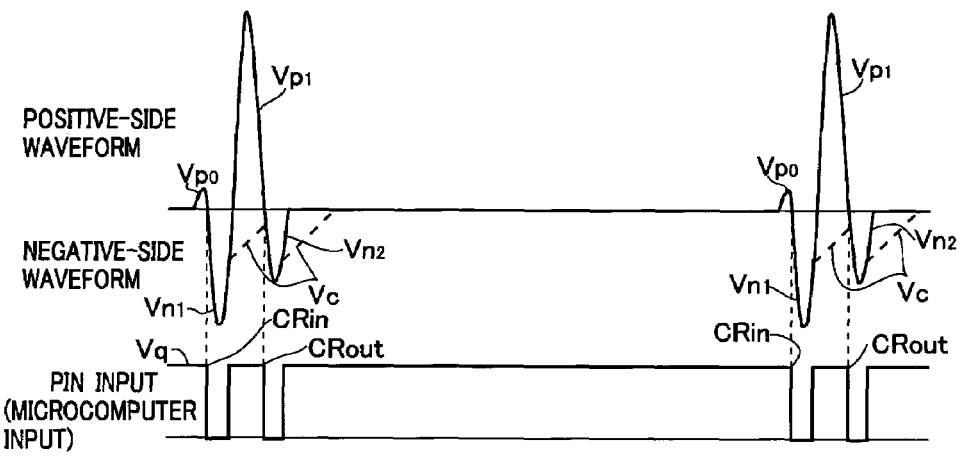
FIGS. 8A, 8B, 8C and 8D are waveform charts which show waveforms of output voltage from an exciter coil and waveforms of rectangular wave signal, used for illustrating operation in the embodiment of FIG. 7.
Figure 8B:
Figure 8C:
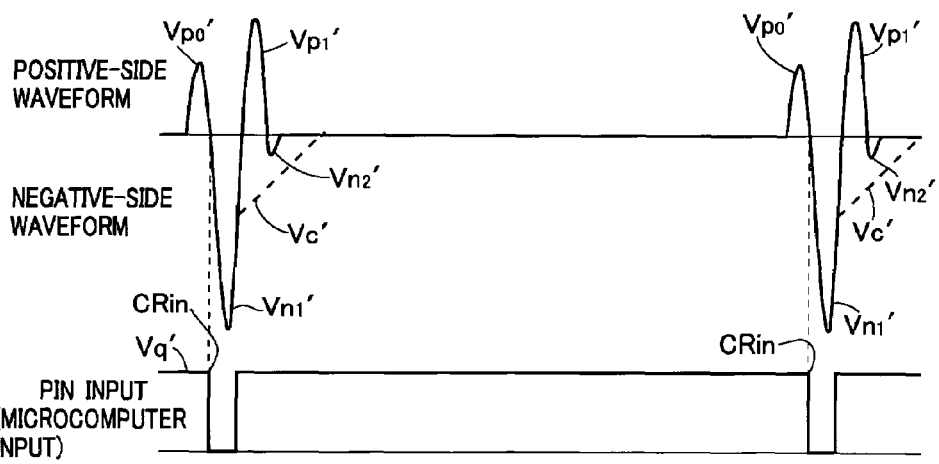
Figure 8D:
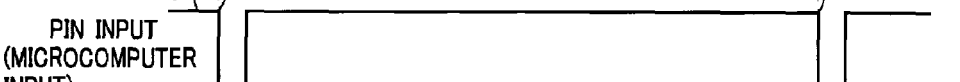

FIGS. 8A and 8B show waveforms of an AC voltage induced by the exciter coil and a rectangular wave signal Vq obtained at the collector of the transistor TR1, respectively, during forward rotation of the engine, while FIGS. 8C and 8D show waveforms of an AC voltage induced by the exciter coil and a rectangular wave signal Vq' obtained at the collector of the transistor TR1, respectively, during reverse rotation of the engine. Voltages Vc and Vc' indicated as broken lines are voltages across the capacitor for filter C1, and serve as cancel levels for canceling input signals. Base current does not flow to the transistor TR1 unless the negative half-wave voltage outputted from the exciter coil exceeds the cancel level. It is possible that the capacitor for filter has an appropriate discharge time constant so that, as shown in FIGS. 8A and 8B, during forward rotation of the engine the transistor TR1 (switch means) changes from the off-state to the on-state upon every generation of each of two negative half-wave voltages Vn1 and Vn2 from the exciter coil EX, while during reverse rotation of the engine the transistor TR1 changes from the off-state to the on-state upon the generation of initial negative half-wave voltages Vn1' from the exciter coil EX but the transistor TR1 maintains the off-state upon the generation of secondary negative half-wave voltage Vn2'.

With the wave-shaping circuit 4 having the above described construction, no crank signal is generated at the generating position of the second negative half-wave voltage Vn2' during reverse rotation of the engine and thus the generating position of the second negative half-wave voltage cannot be detected, so that no ignition operation is performed in case of reverse rotation of the engine. Accordingly, the engine can be prohibited from ignition in case of the engine being caused to reversely rotate, thereby preventing the reverse rotation of the engine.

In examples shown in FIG. 1 and FIG. 7, there is used the rectangular wave signal Vq having a waveform that falls from H-level to L-level upon the generation of the negative half-wave voltage from the exciter coil, while it is also possible that rectangular wave signal Vq is generated that has a waveform that rises from L-level to H-level upon the generation of the negative half-wave voltage from the exciter coil, and the rising of such rectangular wave signal is used as a crank signal.

In this case, wave-shaping circuit 4 is comprised as a wave-shaping circuit comprising a filter comprised of a parallel circuit of a capacitor for filter and a resistor, and switch means which maintains the on-state when the inputted negative half-wave voltage is equal to or less than the voltage across the capacitor for filter and is in the off-state while the inputted negative half-wave voltage exceeds the voltage across the capacitor for filter, and across which a rectangular wave signal is generated, wherein the discharge time constant of the capacitor for filter is set so that the switch means changes from the on-state to the off-state upon every generation of each of the two negative half-wave voltage from the exciter coil EX during forward rotation of the internal combustion engine, while, during reverse rotation of the engine, the switch means changes from the on-state to the off-state upon the generation of initial negative half-wave voltage but maintains the on-state upon the generation of secondary negative half-wave voltage, thereby preventing the reverse rotation of the engine.

Figure 2B:
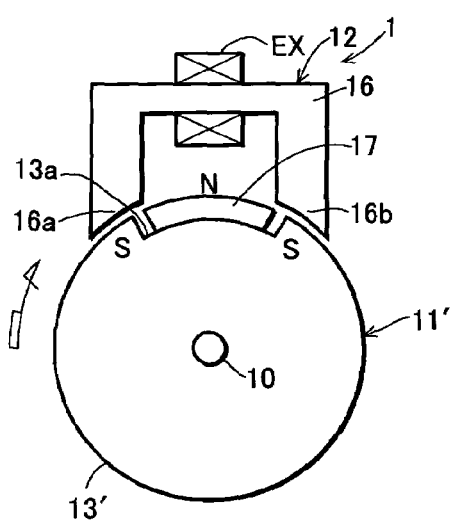

In the above described embodiment, the magneto AC generator is used that comprises the flywheel magnetic rotor 11 comprised as two-pole magnetic field system with the permanent magnet and the magnetic-circuit forming member being cast into the flywheel of non-magnetic material, as shown in FIG. 2A, while the present invention can also be applied in the case where a magneto AC generator 1 is used that, as shown FIG. 2B, comprises a flywheel magnetic rotor 11' comprised as three-pole magnetic field system with a permanent magnet 17 being fixed into a recess 13a formed in the periphery of an iron flywheel 13' and the permanent magnet being magnetized in a radial direction of the flywheel; and a stator 12 with an exciter coil EX being wound around a Π shape core 16 having at its respective ends magnetic poles 16a and 16b opposing to the poles of the magnetic field system. In the case where the exciter coil is provided in the magneto AC generator as shown in FIG. 2B, it is possible that the exciter coil never generates the positive half-wave voltage Vpo prior to the first negative half-wave voltage Vn1 during forward rotation of the engine. In this case, the waveform of AC voltage generated from the exciter coil during reverse rotation of the engine is a waveform obtained by subtracting the negative half-wave voltage Vn2' from the waveform of FIG. 8C, and therefore two negative half-wave voltages do not occur during reverse rotation of the engine. Accordingly, in this case, the reverse rotation of the engine can be prevented without the setting of the discharge time constant of the capacitor for filter in the wave-shaping circuit as described above.

In the embodiment illustrated in FIG. 3, starting-period ignition controlling means 26 is provided with the ignition enabling/disabling means, but the ignition enabling/disabling means may be omitted.

In the algorithm shown in FIG. 13, if the comparison of the rotation count of the crankshaft of the engine after the beginning of the starting operation of the internal combustion engine, Pulse-cnt and the set count STARTNUM gives the result that the rotation count Pulse-cnt exceeds the set count STARTNUM, the engine proceeds to the controlled state of steady-state operation period even when the rotational speed of the engine does not reach the starting determination speed, while the steps 8 and 9 of the FIG. 13 may be omitted so that the determination can be simply made whether the operation state of the engine is a state of starting period or a state of steady-state operation period by determining whether the rotational speed of the engine reaches the starting determination speed or not, without comparison of the rotation count Pulse-cnt and the set count STARTNUM.

In the above described embodiment, the process at the generating position CRout of the second negative half-wave voltage Vn2 of the exciter coil is executed even after the internal combustion engine has become in a state of steady-state operation, while the software or hardware may be comprised so that the process at the generating position CRout of the second negative half-wave voltage Vn2 is not executed after the engine has become in a state of steady-state operation. In order to construct the hardware such that the process at the generating position CRout of the second negative half-wave voltage Vn2 is not executed after the engine has become in a state of steady-state operation, it is possible, for example, that the wave-shaping circuit 4 is comprised as shown in FIG. 7, and the discharge time constant of the capacitor C1 of the filter 4a is set so that the transistor TR1 cannot turn on upon the generation of the second negative half-wave voltage Vn2 when the rotational speed of the engine exceeds the starting determination speed and the peak value of the negative half-wave voltage of the exciter coil is increased.

In the above described embodiment, the rotation count of the crankshaft after the beginning of the starting operation is detected by counting the number of detections of the generating position CRin of the first negative half-wave voltage Vn1, while the rotation count of the crankshaft after the beginning of the starting operation may be detected by counting the number of detections of the generating position CRout of the second negative half-wave voltage Vn2.

Although the preferred embodiments of the invention have been described and illustrated with reference to the accompanying drawings, it will be understood by those skilled in the art that these are by way of example, and that various changes and modifications may be made without departing from the spirit and scope of the invention, which is defined only to the appended claims.

What is claimed is:

1. An ignition device for an internal combustion engine, comprising: an exciter coil that is provided in a magneto AC generator rotating synchronously with the internal combustion engine and generates once for every one rotation of a crankshaft of the engine in forward rotation of the internal combustion engine, an AC voltage having a positive half-wave voltage and first and second negative half-wave voltages present before and after the positive half-wave voltage, respectively; an ignition capacitor that is provided in a primary side of an ignition coil and is charged in one polarity with the positive half-wave voltage; a discharge switch that is provided to turn on upon receiving an ignition signal and cause electric charges stored in the ignition capacitor to be discharged through a primary coil of the ignition coil; and a ignition control unit that supplies the ignition signal to the discharge switch at an ignition position of the internal combustion engine, wherein said ignition control unit comprises: ignition signal generating means that has an ignition timer for measuring ignition position detection time data and generates the ignition signal when the ignition timer completes the measurement of the ignition position detection time data; negative voltage generating position detecting means for detecting a generating position of the first negative half-wave voltage and a generating position of the second negative half-wave voltage; operation state determining means for determining whether the internal combustion engine is in a state of starting period or in a state after completion of starting operation; starting-period ignition controlling means for controlling the generating position of the ignition signal when the operation state determining means determines that the internal combustion engine is in a state of starting period; and steady-state-operation-period ignition controlling means for controlling the generating position of the ignition signal when the operation state determining means determines that the internal combustion engine is in a state of steady-state operation period, and wherein said starting-period ignition controlling means is comprised so as to, upon detection of the generating position of the second negative half-wave voltage, execute a process to arithmetically operate as the ignition position detection time data, time period Tigs that is required for the internal combustion engine to rotate from the generating position of the second negative half-wave voltage to an ignition position suitable in starting period, at the rotational speed of the internal combustion engine that is obtained from time period T1 between detection of the generating position of the first negative half-wave voltage and detection of the generating position of the second negative half-wave voltage, and an angle from the generating position of the first negative half-wave voltage to the generating position of the second negative half-wave voltage.

2. The ignition device for an internal combustion engine according to claim 1, wherein said steady-state-operation-period ignition controlling means is comprised so as to, upon detection of the generating position of the first negative half-wave voltage, execute: a process to arithmetically operate, as the ignition position detection time data, by using a rotational speed of the internal combustion engine obtained from detection period T2 which is a time interval of the detection of the generating position of the first negative half-wave voltage, and an ignition position θign in steady-state operation period of the internal combustion engine arithmetically operated based on the rotational speed, time period Tign required for the engine to rotate from the generating position of the first negative half-wave voltage to the arithmetically operated ignition position θign at the rotational speed of the internal combustion engine obtained from the detection period T2; and a process to cause the ignition timer to start measurement of the ignition position detection time data.

3. The ignition device for an internal combustion engine according to claim 1, wherein said negative voltage generating position detecting means detects the generating position of the first negative half-wave voltage and the generating position of the second negative half-wave voltage, depending on which is longer or shorter, time period from detection of the generating position of the first negative half-wave voltage to detection of the generating position of the second negative half-wave voltage or time period from detection of the generating position of the second negative half-wave voltage to detection of the generating position of the next first negative half-wave voltage.

4. The ignition device for an internal combustion engine according to claim 2, wherein said negative voltage generating position detecting means detects the generating position of the first negative half-wave voltage and the generating position of the second negative half-wave voltage, depending on which is longer or shorter, time period from detection of the generating position of the first negative half-wave voltage to detection of the generating position of the second negative half-wave voltage or time period from detection of the generating position of the second negative half-wave voltage to detection of the generating position of the next first negative half-wave voltage.

5. The ignition device for an internal combustion engine according to claim 1, further comprising: a wave-shaping circuit that receives output of said exciter coil as an input thereof and converts it to a rectangular wave signal falling at the generating position of the negative half-wave voltage; and elapse time detecting means that recognizes the falling of the rectangular wave signal as a crank signal, and reads a measurement value of the timer upon every recognition of the crank signal to detect elapse time from generation of a previous crank signal to generation of a current crank signal, wherein said negative voltage generating position detecting means compares elapse time Told previously detected by the elapse time measuring means with elapse time Tnew currently detected, then detects that the current generating position of the crank signal is at the generating position of the first negative half-wave voltage if the relation Tnew<Told/k (k is a constant equal to or more than 1) is not met, and detects that the current generating position of the crank signal is at the generating position of the second negative half-wave voltage if the relation Tnew<Told/k is met.

6. The ignition device for an internal combustion engine according to claim 2, further comprising: a wave-shaping circuit that receives output of said exciter coil as an input thereof and converts it to a rectangular wave signal falling at the generating position of the negative half-wave voltage; and elapse time detecting means that recognizes the falling of the rectangular wave signal as a crank signal, and reads a measurement value of the timer upon every recognition of the crank signal to detect elapse time from generation of a previous crank signal to generation of a current crank signal, wherein said negative voltage generating position detecting means compares elapse time Told previously detected by the elapse time measuring means with elapse time Tnew currently detected, then detects that the current generating position of the crank signal is at the generating position of the first negative half-wave voltage if the relation Tnew<Told/k (k is a constant equal to or more than 1) is not met, and detects that the current generating position of the crank signal is at the generating position of the second negative half-wave voltage if the relation Tnew<Told/k is met.

7. The ignition device for an internal combustion engine according to claim 1, further comprising: a wave-shaping circuit that receives an output voltage of said exciter coil as an input thereof and converts it to a rectangular wave signal rising at the generating position of the negative half-wave voltage; and elapse time detecting means that recognizes the rising of the rectangular wave signal as a crank signal, and reads a measurement value of the timer upon every recognition of the crank signal to detect elapse time from generation of a previous crank signal to generation of a current crank signal, wherein said negative voltage generating position detecting means compares elapse time Told previously detected by the elapse time measuring means with elapse time Tnew currently detected, then detects that the current generating position of the crank signal is at the generating position of the first negative half-wave voltage if the relation Tnew<Told/k (k is a constant equal to or more than 1) is not met, and detects that the current generating position of the crank signal is at the generating position of the second negative half-wave voltage if the relation Tnew<Told/k is met.

8. The ignition device for an internal combustion engine according to claim 2, further comprising: a wave-shaping circuit that receives an output voltage of said exciter coil as an input thereof and converts it to a rectangular wave signal rising at the generating position of the negative half-wave voltage; and elapse time detecting means that recognizes the rising of the rectangular wave signal as a crank signal, and reads a measurement value of the timer upon every recognition of the crank signal to detect elapse time from generation of a previous crank signal to generation of a current crank signal, wherein said negative voltage generating position detecting means compares elapse time Told previously detected by the elapse time measuring means with elapse time Tnew currently detected, then detects that the current generating position of the crank signal is at the generating position of the first negative half-wave voltage if the relation Tnew<Told/k (k is a constant equal to or more than 1) is not met, and detects that the current generating position of the crank signal is at the generating position of the second negative half-wave voltage if the relation Tnew<Told/k is met.

9. The ignition device for an internal combustion engine according to claim 1, wherein said operation state determining means is comprised so as to determine that the internal combustion engine is in a state of starting period if a rotational speed of the internal combustion engine is lower than a starting determination speed and a rotation count of the crankshaft of the engine after beginning of starting operation of the internal combustion engine is equal to or less than a set count, and determine that the internal combustion engine is in a state of steady-state operation period either if the rotational speed of the internal combustion engine has continued to be equal to or higher than the starting determination speed for a certain period or if the rotational speed of the internal combustion engine is lower than the starting determination speed but the rotation count of the crankshaft of the engine after beginning of starting operation of the internal combustion engine exceeds the set count, and said set count is set at a value corresponding to a maximum rotation count of the crankshaft in the time when cranking is performed by human power while the internal combustion engine cannot be started.

10. The ignition device for an internal combustion engine according to claim 2, wherein said operation state determining means is comprised so as to determine that the internal combustion engine is in a state of starting period if a rotational speed of the internal combustion engine is lower than a starting determination speed and a rotation count of the crankshaft of the engine after beginning of starting operation of the internal combustion engine is equal to or less than a set count, and determine that the internal combustion engine is in a state of steady-state operation period either if the rotational speed of the internal combustion engine has continued to be equal to or higher than the starting determination speed for a certain period or if the rotational speed of the internal combustion engine is lower than the starting determination speed but the rotation count of the crankshaft of the engine after beginning of starting operation of the internal combustion engine exceeds the set count, and said set count is set at a value corresponding to a maximum rotation count of the crankshaft in the time when cranking is performed by human power while the internal combustion engine cannot be started.

11. The ignition device for an internal combustion engine according to claim 1, wherein a plurality of the ignition positions suitable in starting period are set in advance, and an optimum ignition position is selected from ignition positions that are set as the ignition positions suitable in the starting period depending on the rotational speed arithmetically operated from a cycle at which the generating position of the first negative half-wave voltage is detected.

12. The ignition device for an internal combustion engine according to claim 2, wherein a plurality of the ignition positions suitable in starting period are set in advance, and an optimum ignition position is selected from ignition positions that are set as the ignition positions suitable in the starting period depending on the rotational speed arithmetically operated from a cycle at which the generating position of the first negative half-wave voltage is detected.

13. The ignition device for an internal combustion engine according to claim 1, wherein said starting-period ignition controlling means further comprises ignition enabling/disabling means that enables generation of ignition signal in the starting period if a ratio T0/T1, which is ratio of time period T0 between detection of the generating position of the second negative half-wave voltage and detection of the generating position of the next first negative half-wave voltage to the time period T1 between detection of the generating position of the first negative half-wave voltage and detection of the generating position of the second negative half-wave voltage, is equal to or more than a set value, and disables generation of ignition signal in the starting period if the ratio T0/T1 is less than the set value.

14. The ignition device for an internal combustion engine according to claim 2, wherein said starting-period ignition controlling means further comprises ignition enabling/disabling means that enables generation of ignition signal in the starting period if a ratio T0/T1, which is ratio of time period T0 between detection of the generating position of the second negative half-wave voltage and detection of the generating position of the next first negative half-wave voltage to the time period T1 between detection of the generating position of the first negative half-wave voltage and detection of the generating position of the second negative half-wave voltage, is equal to or more than a set value, and disables generation of ignition signal in the starting period if the ratio T0/T1 is less than the set value.

15. The ignition device for an internal combustion engine according to claim 1, wherein said starting-period ignition controlling means further comprises ignition enabling/disabling means that enables generation of ignition signal in the starting period if the time period T1 between detection of the generating position of the first negative half-wave voltage and detection of the generating position of the second negative half-wave voltage is equal to or less than a set value, and disables generation of ignition signal in the starting period if the time period T1 is more than the set value.

16. The ignition device for an internal combustion engine according to claim 2, wherein said starting-period ignition controlling means further comprises ignition enabling/disabling means that enables generation of ignition signal in the starting period if the time period T1 between detection of the generating position of the first negative half-wave voltage and detection of the generating position of the second negative half-wave voltage is equal to or less than a set value, and disables generation of ignition signal in the starting period if the time period T1 is more than the set value.

17. The ignition device for an internal combustion engine according to claim 5, wherein said magneto AC generator is comprised so as to generate another positive half-wave voltage having a peak value lower than the positive half-wave voltage just before the exciter coil generates the first negative half-wave voltage during forward rotation of the internal combustion engine;

the wave-shaping circuit comprises a filter comprised of a parallel circuit of a capacitor for filter and a resistor, and switch means which is in an on-state when the inputted negative half-wave voltage exceeds a voltage across the capacitor for filter, and across which a rectangular wave signal is generated; and a discharge time constant of the capacitor for filter is set so that the switch means changes from an off-state to the on-state upon every generation of each of the two negative half-wave voltage from the exciter coil during forward rotation of the internal combustion engine, while, during reverse rotation of the internal combustion engine, the switch means changes from the off-state to the on-state upon generation of initial negative half-wave voltage but maintains the off-state upon generation of secondary negative half-wave voltage.

18. The ignition device for an internal combustion engine according to claim 6, wherein said magneto AC generator is comprised so as to generate another positive half-wave voltage having a peak value lower than the positive half-wave voltage just before the exciter coil generates the first negative half-wave voltage during forward rotation of the internal combustion engine;

the wave-shaping circuit comprises a filter comprised of a parallel circuit of a capacitor for filter and a resistor, and switch means which is in an on-state when the inputted negative half-wave voltage exceeds a voltage across the capacitor for filter, and across which a rectangular wave signal is generated; and a discharge time constant of the capacitor for filter is set so that the switch means changes from an off-state to the on-state upon every generation of each of the two negative half-wave voltage from the exciter coil during forward rotation of the internal combustion engine, while, during reverse rotation of the internal combustion engine, the switch means changes from the off-state to the on-state upon generation of initial negative half-wave voltage but maintains the off-state upon generation of secondary negative half-wave voltage.

19. The ignition device for an internal combustion engine according to claim 7, wherein said magneto AC generator is comprised so as to generate another positive half-wave voltage having a peak value lower than the positive half-wave voltage just before the exciter coil generates the first negative half-wave voltage during forward rotation of the internal combustion engine;

said wave-shaping circuit comprises a filter comprised of a parallel circuit of a capacitor for filter and a resistor, and switch means which maintains an on-state when the inputted negative half-wave voltage is equal to or lower than a voltage across the capacitor for filter and is in an off-state while the inputted negative half-wave voltage exceeds the voltage across the capacitor for filter, and across which a rectangular wave signal is generated; and a discharge time constant of said capacitor for filter is set so that the switch means changes from the on-state to the off-state upon every generation of each of the two negative half-wave voltage from the exciter coil during forward rotation of the internal combustion engine, while, during reverse rotation of the internal combustion engine, the switch means changes from the on-state to the off-state upon generation of initial negative half-wave voltage but maintains the on-state upon generation of secondary negative half-wave voltage.

20. The ignition device for an internal combustion engine according to claim 8, wherein said magneto AC generator is comprised so as to generate another positive half-wave voltage having a peak value lower than the positive half-wave voltage just before the exciter coil generates the first negative half-wave voltage during forward rotation of the internal combustion engine;

said wave-shaping circuit comprises a filter comprised of a parallel circuit of a capacitor for filter and a resistor, and switch means which maintains an on-state when the inputted negative half-wave voltage is equal to or lower than a voltage across the capacitor for filter and is in an off-state while the inputted negative half-wave voltage exceeds the voltage across the capacitor for filter, and across which a rectangular wave signal is generated; and a discharge time constant of said capacitor for filter is set so that the switch means changes from the on-state to the off-state upon every generation of each of the two negative half-wave voltage from the exciter coil during forward rotation of the internal combustion engine, while, during reverse rotation of the internal combustion engine, the switch means changes from the on-state to the off-state upon generation of initial negative half-wave voltage but maintains the on-state upon generation of secondary negative half-wave voltage.

* * * * *